United States Patent [19]

Sasagaki et al.

[11] Patent Number: 5,608,491
[45] Date of Patent: Mar. 4, 1997

[54] CAMERA WITH SIMPLIFIED PARAMETER SELECTION AND DUAL MODE OPERATION AND METHOD OF OPERATION

[75] Inventors: Nobuaki Sasagaki; Takashi Saegusa, both of Kanagawa-ken, Japan

[73] Assignee: Nikon Corporation, Tokyo, Japan

[21] Appl. No.: 377,825

[22] Filed: Jan. 25, 1995

[30] Foreign Application Priority Data

Feb. 4, 1994 [JP] Japan ................................. 6-013026
Feb. 4, 1994 [JP] Japan ................................. 6-032949

[51] Int. Cl.⁶ .............................. G03B 7/00; G03B 17/18
[52] U.S. Cl. .......................... 396/243; 396/239; 396/287
[58] Field of Search ............................... 354/474, 471, 354/289.1, 289.12, 441, 442, 443

[56] References Cited

U.S. PATENT DOCUMENTS 5,191,373  3/1993  Nakano ................... 354/474

FOREIGN PATENT DOCUMENTS 4-81731  3/1992  Japan .
4-81732  3/1992  Japan .
4-81733  3/1992  Japan .
4-81734  3/1992  Japan .

*Primary Examiner*—W. B. Perkey
*Attorney, Agent, or Firm*—Oliff & Berridge

[57] ABSTRACT

A camera is provided so that an inexperienced photographer is able to see the data easily regarding the necessary parameter for setting, and furthermore, the setting input operation of that parameter can be accomplished easily. The camera has a display that offers a selection of parameters and a display that verifies the parameter selected. The display showing the selected parameter is easily returned to the original selection display. Two operating modes are provided, a simple mode and an advanced mode. In the simple mode, an automatic preprogrammed mode may be selected at any time by continuously depressing a menu switch. In the advanced mode, continuous depression of the menu switch allows a user to automatically use a prestored favorite mode or the previously selected mode. Thus, operation is easy and selections are quickly executed.

38 Claims, 26 Drawing Sheets

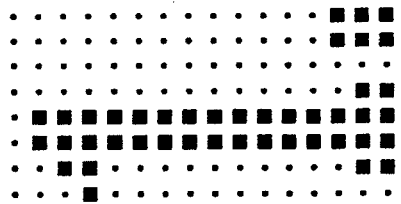
FIG.5d 「1A」
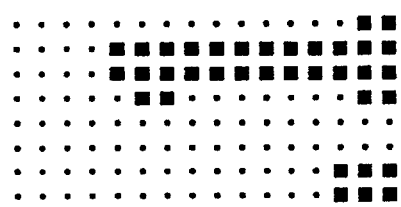
FIG.5c 「11」
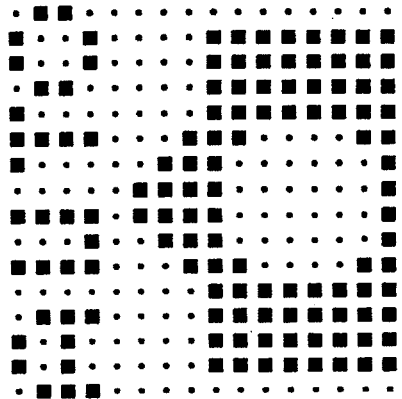
FIG.6b
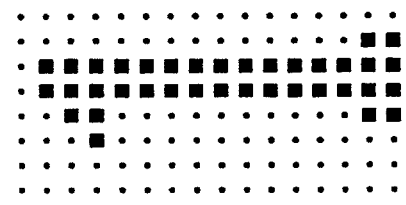
FIG.5b 「41」
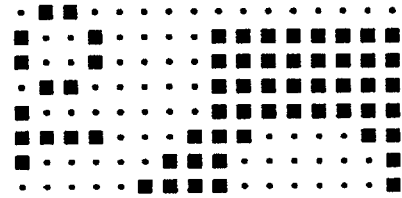
FIG.6a 「81」
FIG.5a 「01」
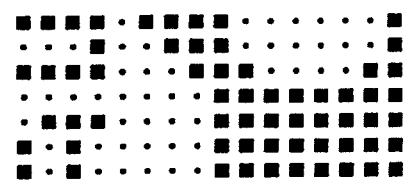
「80」

|   | 00 | 10 | 20 | 30 | 40 | 50 | 60 | 70 | 80 | 90 | A0 | B0 | C0 | D0 | E0 | F0 |
|---|----|----|----|----|----|----|----|----|----|----|----|----|----|----|----|----|
| 0 | 0 | .0 |   | P | 0 | p | . |   | ō | P | ⇦ | ŏ | ♠ | ☺ | ◬ |   |
| 1 | 1 | .1 | A | Q | 1 | q | , |   | ō | P | ⇦ | ŏ | ♠ | ☺ | ◬ |   |
| 2 | 2 | .2 | B | R | 2 | r | · |   | ▲ | S | ⇨ | ▥ | ↯ | ☽ | ? |   |
| 3 | 3 | .3 | C | S | 3 | s | * |   | ▲ | S | ⇨ | ▥ | ↯ | ☽ | ? |   |
| 4 | 4 | .4 | D | T | 4 | t | + |   | ♃ | A | ▣ | — | ♆ | ▭ |   |   |
| 5 | 5 | .5 | E | U | 5 | u | - |   | ♃ | A | ▣ | — | ♆ | ▭ |   |   |
| 6 | 6 | .6 | F | V | 6 | v | ± |   | ♇ | M | ▦ | ⊥ | ♌ | ▭ |   |   |
| 7 | 7 | .7 | G | W | 7 | w | ∗ |   | ♇ | M | ▦ | ⊥ | ♌ | ▭ |   |   |
| 8 | 8 | .8 | H | X | 8 | x | < |   | ⚹ | ▣ | ♄ | ↑ | ♋ | — |   |   |
| 9 | 9 | .9 | I | Y | 9 | y | > |   | ⚹ | ▣ | ♄ | ↑ | ♋ | — |   |   |
| A | 0 | 1. | J | Z | 0 | z | = |   | ⚘ | ▣ | ⊕ | ▧ | ⊙ |   |   |   |
| B |   |    | K |   | k |   | : |   | ⚘ | ▣ | ⊕ | ▧ | ⊙ |   |   |   |
| C |   |    | L |   | l |   | / |   | ▥ | ▥ | S | ♎ | ♌ | Eπ |   |   |
| D |   |    | M |   | m |   | ? |   | ▥ | ▥ | S | ♎ | ♌ | Eπ |   |   |
| E |   |    | N |   | n |   | ! |   | ▣ | ▨ | C | ♍ | AF | ♈ |   | ▩ |
| F |   |    | O |   | o |   | ‖ |   | ▣ | ▨ | C | ♍ | AF | ♈ |   | ▩ |

FIG. 7

CAMERA WITH SIMPLIFIED PARAMETER SELECTION AND DUAL MODE OPERATION AND METHOD OF OPERATION

This application is directed to subject matter that is related to subject matter in co-pending U.S. patent application Nos. 08/378,351; 08/377,604; 08/377,839; 08/377,838; 08/377,840; 08/377,836; 08/378,449 filed simultaneously herewith by the same inventors, which are all hereby incorporated by reference.

BACKGROUND OF THE INVENTION

1. Field of the Invention

This invention relates to a camera capable of specific functions based on automatically selected parameters and by inputting parameters, such as the exposure mode. In particular, the invention relates to a camera capable of selecting a targeted parameter from a plurality of preset parameters.

2. Discussion of Related Art

In recent years, with the use of computers, the camera has become capable of performing numerous functions. Automatic focusing adjustment (AF) devices and automatic exposure (AE) devices are representative examples of such functions. In addition, various types of monitor functions, such as a film sensitivity setting, detection of the number of pieces in film, and warnings of deflection of the camera, have been developed.

As the use of multi-function cameras and cameras with various types of monitoring is promoted, as mentioned above, the data related to the functions above must be supplied to the camera. For example, such data relates to the setting of various types of parameters for automatic exposure, automatic focus, and display of the monitor data. To accomplish setting and display, cameras developed in recent years have been equipped with display devices, such as liquid crystal displays.

Japanese Unexamined Utility Model Publication No. Hei 3-42141 is one such example. Its technology relates to the display device of a camera that displays picture taking information relative to that camera, the display component being placed on the camera main body. A dot LCD (liquid crystal display device) is used for the display section. This display section is divided into a plurality of areas. The divided display device displays a sub-title of information in each area. The camera is also equipped with a total display device that displays detailed data in the display section described above.

A sub-title information selection device selects one of the sub-titles displayed by the divided display device. An image screen switch-over device displays the subordination data of the sub-title information selected to the display section via the total display device described above when one of the sub-titles is selected. While the photographer watches the sub-title being displayed, he or she operates the switch until the desired sub-title data is displayed. When the desired sub-title is displayed on one of the divided areas, the operation switch corresponding to the areas is activated to select the sub-title. In this manner, when the sub-title is selected, the subordination data of the sub-title information is displayed on the display section, via the total display device by the image screen switch-over device.

However, there is the problem in the conventional technology that the corresponding relationship between the operational switch and the display is not clear. Furthermore, while the photographer watches the sub-title information being displayed, it is necessary to operate the switch until the desired title information is displayed, which is time consuming. In addition, with the conventional technology, when the desired sub-title is displayed on one of the divided areas, the operation switch corresponding to each area must be operated to select the sub-title. Therefore, it is necessary to carry out the operation for display and the operation for selection. This complicates the operation and, furthermore, inconveniently requires the operation to be repeated. Especially when complicated selection operations are needed, it is difficult for the photographer not accustomed with the system to accomplish the intended function.

In addition, when the operation is too complicated, the problem may occur that the photographer may lose the present conditions of the camera. In other words, when the operation is repeated many times, the photographer loses the conditions set at that time. Further, even if the photographer tries to confirm the display, it is not clear what to look for. Furthermore, since the operation itself is too complicated, it is difficult to easily go back to the initial display.

Also, a photographer does not always use a different mode, and, on many occasions, the favorite mode of the photographer will remain constant. In such a case, it is desirable that the targeted mode should be selected immediately, without going through a complicated selection operation. In addition, an inexperienced photographer will probably desire to take pictures by entrusting parametric determinations to the camera, without performing complicated operations.

SUMMARY OF THE INVENTION

It is an object of the invention to overcome the problems described above, and to provide a usable camera in which the data relating to the necessary parameters for setting can be easily read by the photographer who is not accustomed to the camera.

It is also an object of the invention to provide a camera with a display that is easily seen and quickly understood.

Furthermore, it is an object of the invention to provide a camera in which the setting input operation of a selected parameter can be carried out easily.

Another object of the invention is to provide a camera with a short selection operation and with the capability of directly setting a specific parameter.

An additional object of the invention is to provide a camera capable of offering a preset selection of parameters and of automatically selecting appropriate parameters if desired by a user.

According to one aspect of this invention for obtaining the objects described, the camera is capable of selectively inputting a targeted parameter from a plurality of preset parameters. The camera is equipped with a display unit having a dot matrix display section. A selection operation component accomplishes the selection of the targeted parameter. A change operation component accomplishes the selection operation and is installed separately from the selection operation component. A control unit controls the operation of the camera, and a memory device stores the specific parameters. The control unit receives the selection input of the parameter by the selection operation component and creates a first display to indicate a symbol for the selection branches in order to accomplish the selection of the parameter. The control unit also creates a second display to indicate that the parameter is selected by the selection operation component and receives the change operation by the change operation component. The change operation reads the specific parameter data stored in the memory device and installs the selected parameter.

The control unit, for example, is structured to accomplish at least (a) the process to set up the first state for selection of the parameter and the second state for selection of the specific parameter to store the selections in the memory device, and (b) the process for receiving the selection of the parameter input by the selection operation component in the first state and for receiving the selection of the specific parameter by the selection operation component and at the same time storing the received specific parameter in the memory device in the second state.

The memory device preferably stores the potential parameters in advance and also stores the selected parameter. It is desirable that this memory device contains a back-up capability to cover the time when the power source is OFF.

The control unit also has the capability of automatically selecting the parameter itself without input from the change operation component. In this case, the control unit reads the stored parameters and selects the appropriate parameter indicated by the photographic conditions.

The control unit can also terminate the selection operation, in the case that the change operation component accomplishes the selection operation before the elapse of a designated time allotted for selection, through the second display and automatically return the second display to the first display.

In addition, the control unit prepares a menu screen for mode selection and a menu screen to set the function in the first display process described. The control unit also controls the display of the menu of the mode selection described on a priority basis, and changes the first display to the function setting menu screen when the change operation is received from the change operation component described when the menu screen of the mode selection is displayed.

The function setting menu described can contain at least one of a film sensitivity setting, an AF (automatic focus) mode setting, and an exposure adjustment quantity setting. The display device is able to display optional symbols by means of the dot matrix display section.

The selection operation component accomplishes the selection of the targeted parameter described to be displayed. In addition, the change operation component is installed separately from the options for the selection operation component and changes the selection operation.

The memory device stores specific parameters, such as movement parameters and their associated data elements, such as the exposure mode and function.

According to another aspect of this invention for obtaining the objects described above, a camera is provided that is capable of easily selecting the targeted parameter from a plurality of preset parameters using the display and corresponding switches. The camera is equipped with a display device containing a dot matrix display section, which is composed of a plurality of display blocks. A first switch group that contains a plurality of switches is installed corresponding to the plurality of display blocks described above. A second switch assembly, which contains the menu or change operation switch in this embodiment, is installed separately from the first switch group described above and the control unit to control the movement of camera.

The control unit described above creates the first display to show a symbol indicating the selection branch to select the parameter in the display block unit described above and creates the second display to indicate that the parameter is selected. The selection of a parameter is accomplished by operating one of the switches, which is coordinated with the appropriate display block from the first display of the dot matrix display section. Operation of the second switch returns the second display to the first display.

The display blocks described above are placed in a row, and each switch in the first switch group is aligned with a display block and arranged in parallel with the row of display blocks.

The display device can be further equipped with an auxiliary display section, which displays a display element to optically indicate the relationship between each display block and each switch of the first switch group. This auxiliary display section, for example, can be placed between the row of the display blocks and the row of switches of the first switch group. The auxiliary display section can be designed with segments arranged in a certain pattern. For example, each segment of the auxiliary display section can be in the form of a graphic pattern suggesting direction, such as a triangle.

The control unit displays a symbol indicating the selected parameter in each display block for the selection branch in the first display and displays a symbol for the selected parameter in one of the display blocks in the second display. The display device described above contains a memory section for storing character patterns or icons to indicate the symbol of the selected parameter.

The control unit displays a symbol representing each possible mode for each display block, one of them being the exposure mode for example. Specifically, the following modes can be employed: an automatic mode to accomplish the combination operation of the aperture and shutter speed for the camera, a scenery mode suitable for scenery picture taking, a portrait mode suitable for portrait picture taking, and a close-up mode suitable for close-up picture taking.

Each switch in the first switch group described above is desirably placed toward the front direction of the body upper surface of the camera. In addition, the second switch, in the same manner, is placed toward the front direction of the body upper surface of the camera. These switches are preferably designed as push-button switches but can be any type of known switch.

The display device is also capable of displaying the symbol of the selected branch in an optional form on the dot matrix display section. In other words, the plurality of icons prepared in advance can be displayed appropriately on the same display areas. By so doing, a limited display area can be efficiently utilized.

The selection of the selected branch is accomplished by operating the plurality of switches corresponding to the plurality of display blocks described above. By placing a display block and switch in parallel, for example, the corresponding relationship between the selected branch and the switch to be operated can be understood easily. Therefore, even if the photographer is inexperienced, he or she can operate the switches with certainty by merely viewing the display block and operating the corresponding switch.

The control unit creates the first display to show the symbol indicating the selected branch for the selected parameter on the display block unit and creates the second display to indicate that the parameter is selected and implemented. By so doing, the display (in the selection state) to accomplish the selection of the parameter and the display (in the non-selection state) for which the parameter is selected and implemented can be clearly distinguished on the display screen. Therefore, the photographer will not be confused concerning the operation or will not make too many mistakes, since the number of possible operations is limited at this point.

In addition, the control unit, under the first display, coordinates the operation of each switch of the first switch group to the respective display block and receives the selection of the parameter by the appropriate switch operation. Therefore, as described above, the corresponding relationship between the display and the operated switch can be clearly understood.

In addition, the control unit, under the second display, receives a signal from the operation of the second switch and returns the second display to the first display. By so doing, the photographer is always able to return to the initial display state, which will prevent confusion during operation.

In addition, the control unit is capable of displaying the symbol representing each of the modes with the first display. Namely, the automatic mode to entrust photography to the camera totally, the mode suitable for scenery pictures, the mode suitable for portrait pictures, and the mode suitable for close-up pictures, are displayed in each display block. In general, a camera with higher functionality tends to have many selection parameters and, in addition, tends to have numerous functions to be selected. Therefore, it is not simple to select the necessary mode when pictures are taken in an every day situation. For that reason, depending on the photographer, typically the way to use the camera is not clear, which inhibits the camera from being used properly. This invention enables the picture taking operation to be simple and appropriate by selecting only the necessary mode normally from the first display. As a result, a camera having high functionality can be utilized effectively.

BRIEF DESCRIPTION OF THE DRAWINGS

FIG. 4b is an explanatory diagram of a display block from the display panel structure of FIG. 4a.

FIGS. 5a–d are explanatory diagrams showing display examples of symbols in the display blocks in the dot matrix display section used in this invention.

FIGS. 6a and 6b are explanatory diagrams showing display examples for the dot matrix display section of this invention.

FIG. 7 is an explanatory diagram showing an example of the display symbols and icons stored in the pattern generator used in this invention.

DETAILED DESCRIPTION OF PREFERRED EMBODIMENTS OF THE INVENTION

Figure 1:
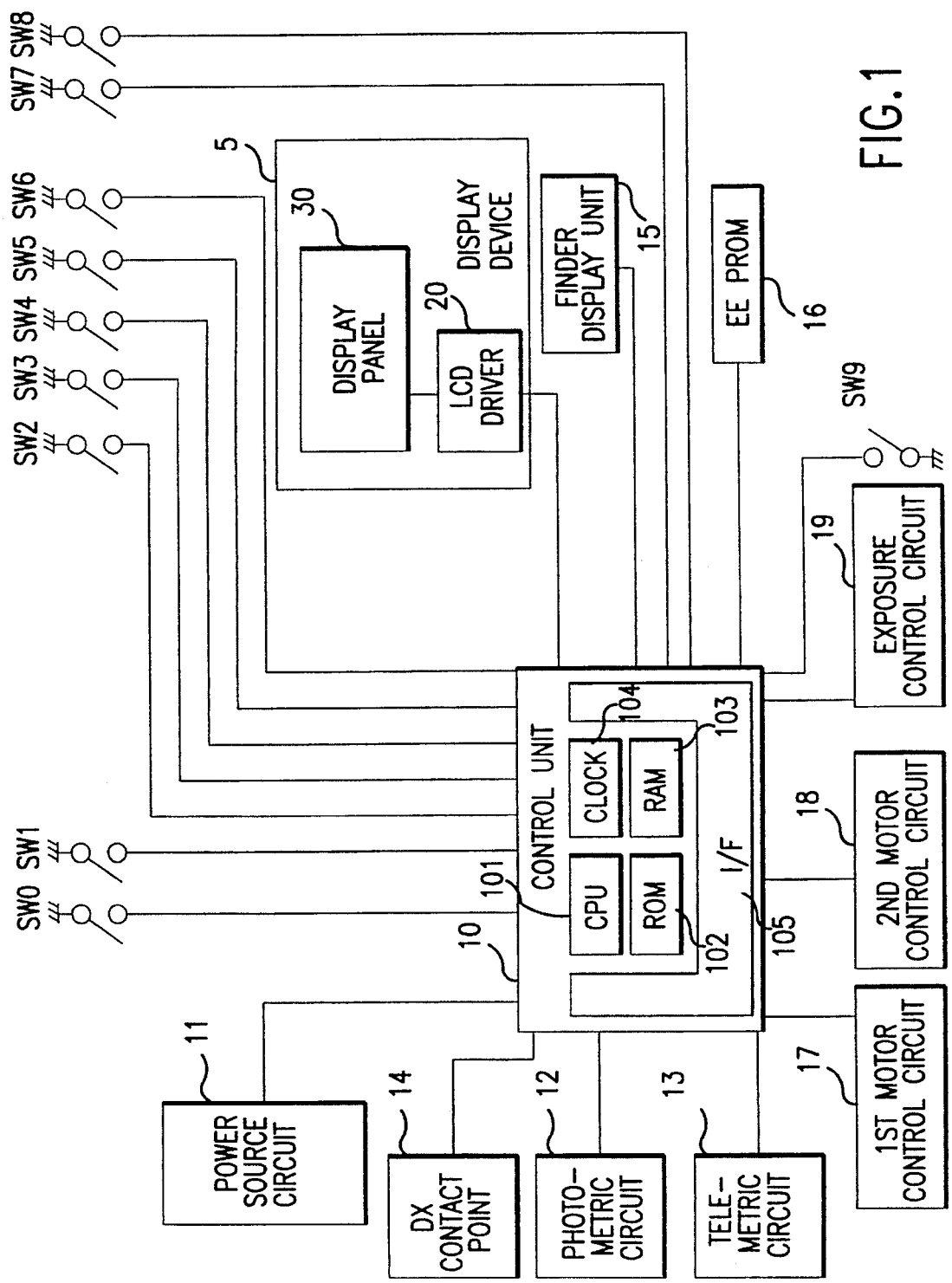
FIG. 1 is a schematic drawing of the hardware system structure of one of the embodiments of a camera according to the invention.
Figure 2:
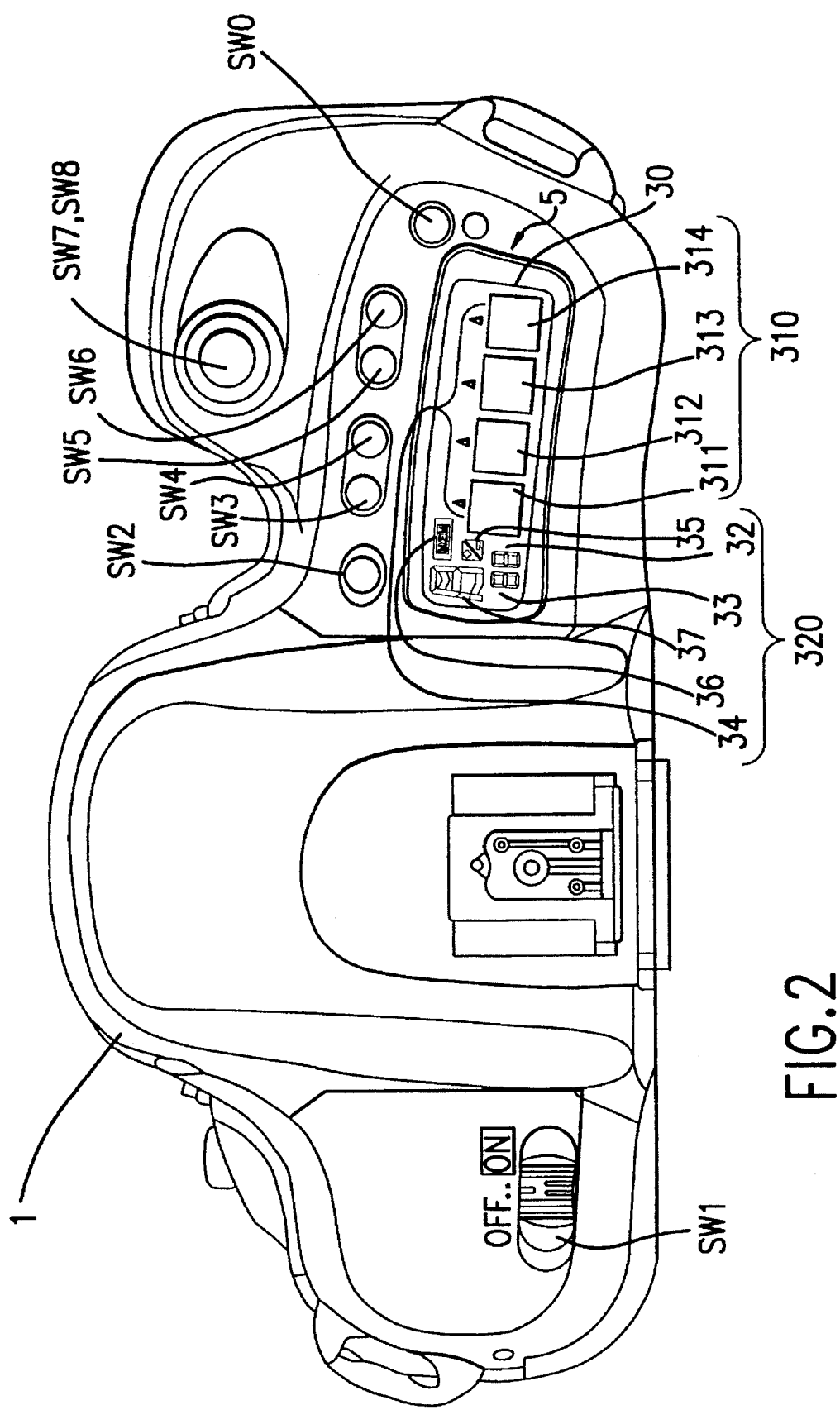
FIG. 2 is a top view of the preferred external appearance of the upper surface body in an embodiment of a camera according to this invention.

FIG. 1 shows an example of the hardware system structure of an embodiment of a camera according to the present invention. FIG. 2 shows an example of the external appearance of the upper surface body 1 of an embodiment of a camera according to the present invention. The camera includes the conventional components of a photographic system, such as a lens, a focus system, a mirror assembly, a light sensor, and a film drive assembly, contained within body 1.

The embodiment shown in FIG. 1 is equipped with a display device 5 that accomplishes the display of data for the photographer from the camera side and a control unit (MCU) 10 that accomplishes the control of the camera operation and oversight. Control unit 10 is connected to display device 5 as shown in FIG. 1.

Control unit 10 is also connected to a photometric circuit 12 that accomplishes photometry, a telemetric circuit 13 that measures distance, and a DX contact point 14 that reads the film sensitivity. A first motor control circuit 17, a second motor control circuit 18, an exposure control circuit 19, EEPROM 16 (read only memory capable of re-write) that functions a memory device to store data, and a finder display unit 15 are also connected to control unit 10. Control unit 10 controls and monitors the operations described. It would also be appropriate if desired to install a sensor (not shown in the drawings) to monitor the movement or shake of the camera, which would be coupled to control unit 10 to transmit signals representative of the sensor readings. Additionally, an electric source circuit 11 is coupled to control unit 10 to supply electric power to control unit 10 and hence the system.

First motor control circuit 17 is a circuit to control the driving of the motor that drives the lens. In the preferred embodiment, first motor control circuit 17 controls driving of a zoom drive and a focus drive. In addition, second motor drive circuit 18 is a circuit that controls the motor drive to accomplish the mirror up and down drive and the film supply drive. Exposure control circuit 19 is a circuit that controls the aperture, the shutter and adjustment of light.

As seen in FIG. 2, display device 5 is equipped with a display panel 30, installed to the right side section of the upper surface of the body 1, for example. An LCD driver 20, which comprises the driving device to accomplish the display drive of display panel 30, is installed in body 1 of the camera. Display panel 30, in this embodiment, is structured using a liquid crystal display panel, wherein the size, layout, location, and placement of which are determined by the shape and location of the display control system.

Figure 4A:
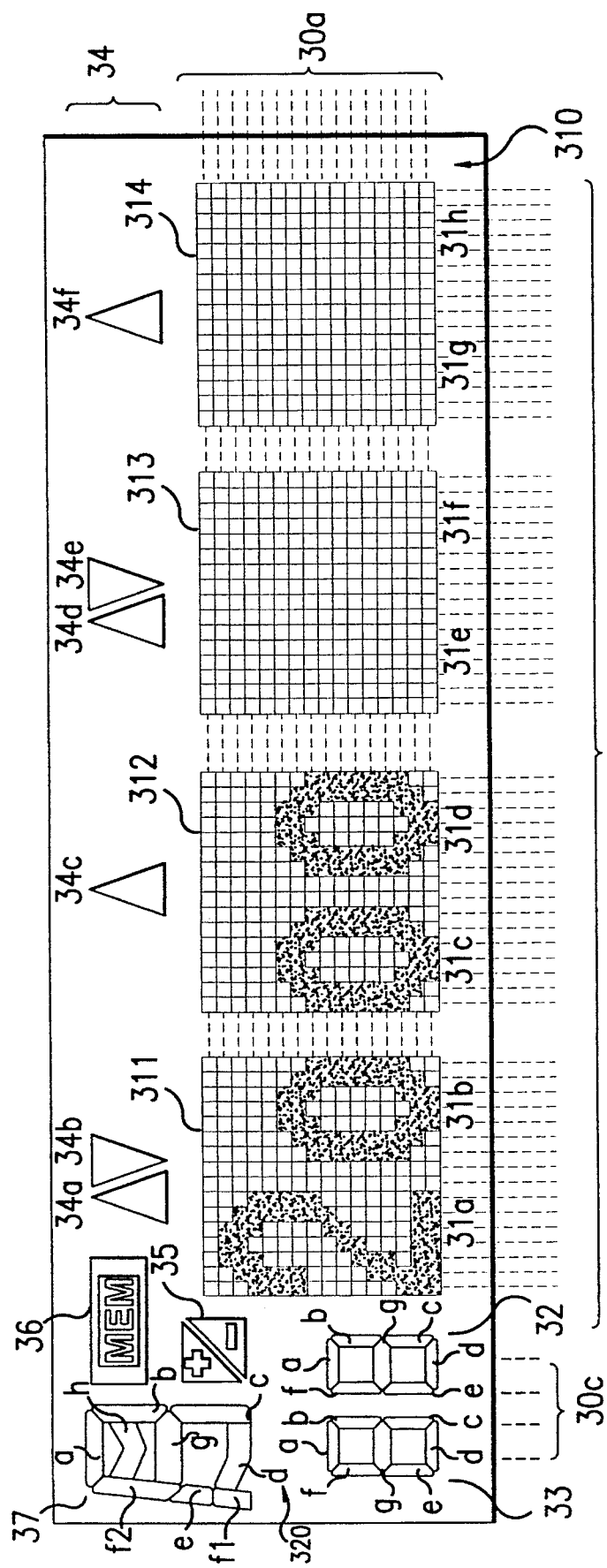
FIG. 4a is an explanatory diagram showing an example of the display panel structure used in this invention.

Display panel 30 includes a dot matrix display component 310 and a segment display component 320, as seen in FIG. 2. In dot matrix display component 310, as shown in FIG. 4a, a plurality of display blocks 311, 312, 313 and 314 are placed horizontally. These display blocks 311, 312, 313 and 314 are structured with dot matrix display units 31a through 31h, which accomplish the display with a column width of one half of an em pica, with an "em" being the space occupied by an M in pica-size type. A half em is also known as an en, with an "en" being the space occupied by an N in pica-size type. Preferably, each of the half em units 31a through 31h is structured with 16 vertical dots and 8 horizontal dots.

In other words, each pair of dot matrix display units (31a and 31b), (31c and 31d), (31e and 31f) and (31g and 31h) form a display block 311 through 314, respectively. Each display block 311 through 314 is aligned horizontally with a predetermined spacing. In this manner, through the establishment of a space between each display block, it is possible to achieve an easily seen display. Especially when several symbols representing the selected display element are lined up, the space between each display block allows easy recognition and prevents confusion. For example, when the symbol "1" is displayed in combination with other symbols, the spacing allows the viewer to recognize that the symbol is a single number rather than an element of a larger number.

In this embodiment, electrodes are not installed in the space between the display blocks 311, 312, 313 and 314 of the dot matrix display component 310. However, it is possible to prepare a structure having an electrode positioned in the space between the display blocks. In such a case, it would be possible to show a space between symbols in the display by not activating the dots for the empty space.

Figure 4B:
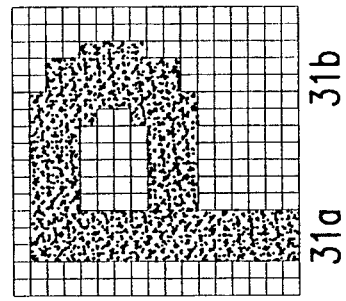

Each pair of display units, 31a and 31b, for example as shown in FIG. 4b, can be used to make the display of "P" with an em using a 16×16 dot matrix. There are eight 16×8 dot matrixes in the dot matrix display component 310, which are connected to 16 pieces of a common terminal 30a and 8×8=64 pieces of a segment terminal 30b. Each display block is driven by the voltage applied to these terminals 30a and 30b. Since there are 16 pieces of common terminal 30a, 1/16 duty cycle is accomplished.

m×n. For example, it is possible to make m=24 dots and n=16 dots.

Segment display component 320 is equipped with two seven segment display components 32 and 33 and an auxiliary display component 34 that functions at least as a display element to display the corresponding relationship between the blocks and switches. Optionally, display component 320 includes an exposure adjustment display component 35 that lights when the exposure adjustment is made, a memory mode display component 36 that lights when the function is set to move to the picture taking mode stored in the memory, and a mode display component 37 that displays the present mode.

As seen in FIG. 4a, each seven segment display component 32 and 33 is composed of seven segments, a through g. In addition, the display components can also be structured with more than seven segments. For example, each single segment can be configured as a double segment or additional cross segments can be added to increase the display capability.

Auxiliary display component 34 is structured with six pieces of triangular segments 34a through 34f. The bases of triangular segments 34a, 34c, 34d and 34f are placed facing dot matrix display component 310 and in correspondence with the four em display blocks 311 through 314. In addition, triangular segments 34b and 34e are placed in the reverse direction to triangular segments 34a, 34c, 34d and 34f, in correspondence with display blocks 311 and 313 and adjoining triangular segments 34a and 34d.

Exposure adjustment display component 35 and memory mode display component 36 are each structured with one segment. On the other hand, the mode display component 37 is composed of 37a, 37b, 37c, 37d, 37e, 37f1, 37f2, 37g and 37h, placed so that each initial letter of each mode, including "P", "S", "A", "M", and "F" can be displayed. Among these segments, 37f1 and 37f2 are wired as a common segment 37f. Therefore, structuring is accomplished with a total of 8 segments.

Segment display component 320 is composed of a total of 30 segments, as seen in FIG. 4a. However, obviously if exposure adjustment display component 35, memory mode display component 36, and mode display component 37 are not used, segment display component 320 would only comprise 20 segments. Terminal 30a is used in common with dot matrix display component 310 and is driven with a 1/16 duty cycle. Therefore, it is appropriate to use at least two pieces of segment terminals. However, it is also appropriate to slightly increase the number of terminals, taking the degree of freedom in wiring fret into consideration. In this embodiment, for example, as shown in Table 1 below, it is appropriate to use four pieces of segment terminal 30c (SEG 64 through SEG 66), using 8 pieces of COM terminal (COM 0–7).

TABLE 1

|        | COM 7 | COM 6 | COM 5 | COM 4 | COM 3 | COM 2 | COM 1 | COM 0 |
|--------|-------|-------|-------|-------|-------|-------|-------|-------|
| SEG 64 |       | 32 g  | 32 f  | 32 e  | 32 d  | 32 c  | 32 b  | 32 a  |
| SEG 65 |       | 33 g  | 33 f  | 33 e  | 33 d  | 33 c  | 33 b  | 33 a  |
| SEG 66 | 36    | 35    | 34 f  | 34 e  | 34 d  | 34 c  | 34 b  | 34 a  |
| SEG 67 | 37 h  | 37 g  | 37 f  | 37 e  | 37 d  | 37 c  | 37 b  | 37 a  |

For purposes of explanation in this embodiment, each display unit 311–314 is structured with a picture element of 16 vertical dots×8 horizontal dots. However, the present invention is not limited to the design specifics described above. For example, the picture element can have any size As described above, with this embodiment, it is assumed that the segment display component differs only in shape from the dot matrix display component. In other words, the size of one of the segments differ, yet they each contain an identical voltage value as the dot matrix display. In this manner, when a common drive is used, it is efficient because the circuit can be simplified. In addition, when the common segment display component is separated from the common dot matrix component and they are driven independently, the characteristics of the segment display component can be controlled separately from the dot matrix display. As a result, in terms of duty cycle, the characteristics can be improved by that amount. However, there is no advantage to separate drives, unless the characteristics of the display component as a whole are improved, even though the characteristics in only the segment display component may be improved. Furthermore, it is desirable to use the common drive method, as in this embodiment, considering the fact that if the characteristics in the dot matrix display component are improved, there is then no need for improvement for the segment display component.

When LCD driver 20 receives the appropriate signal from MCU 10, the dot display can be created by dot matrix display component 310 by the character generator in MCU 10. At the same time, the segment display can be made in accordance with a signal from MCU 10 to segment display component 320. In addition, finder LCD 15 is driven directly by a special output port for LCD of MCU 10.

Figure 3:
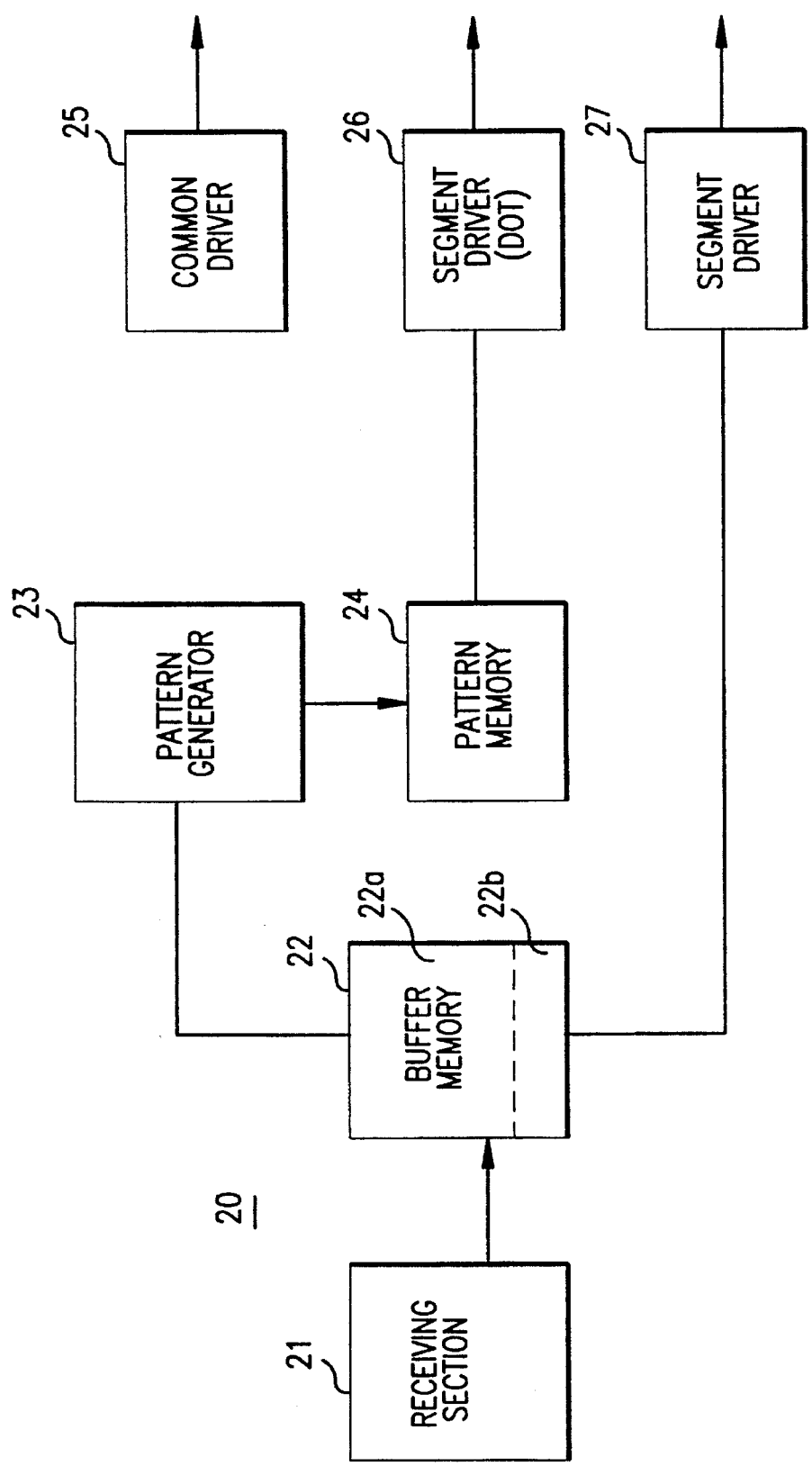
FIG. 3 is a block diagram showing one of the examples of the liquid crystal driver structure used in an embodiment according to this invention.

FIG. 3 shows one example of the structure of LCD driver 20. In the diagram, LCD driver 20 is equipped with a receiving component 21 that receives a signal from control unit 10, a buffer memory 22 that stores the received data temporarily, a pattern generator 23 that reads the command of data stored in buffer memory 22 and creates the symbol pattern indicated by the command, a pattern memory 24 that stores the created pattern, a common driver 25 that drives dot matrix display component 310 and segment display component 320 of display panel 30 with the common duty cycle, a segment driver (column driver) 26 that reads the pattern stored in pattern memory 24 and displays it using the dot matrix, and a segment driver 27 that reads the segment display data from the data stored in buffer memory 22 and drives the corresponding segment.

Buffer memory 22 is equipped with capacity for storing the 12 byte data. The memory is divided into a dot data memory block 22a, which stores D 0 through D 7 for dot matrix display component 310, and a segment data memory block 22b, which stores D 8 through D 11 for segment display component 320, among the command columns D 0 through D 11, which will be explained later.

Common driver 25 drives the common signal wire of dot matrix display component 310 and segment display component 320 via common terminal 30a described previously. Segment driver 26 drives dot matrix display component 310 via segment terminal 30b. Segment driver 27 drives segment display component 320 via segment terminal 30c.

Pattern generator 23 has a memory and a reading drive circuit (neither are shown in the drawing). The memory stores the display patterns (symbols and icons) as shown in FIG. 7 in a 16×16 matrix. These patterns prepare the symbols and icons representing the contents of the selected branch and the symbols displaying the warning, etc. In FIG. 7, the horizontal row corresponds to the superordination address and the vertical column corresponds to the subordination address.

In addition, in FIG. 7, the numeral symbols between the address "00"- "0A" and "40"- "4A" are the same as the display pattern shown in FIGS. 5(a) and (b). However, the display position is slightly dislocated to the left and the right. In this manner, when numerals containing plural digits are displayed over a plurality of display blocks, it is possible to accommodate the dislocation due to the space between each display block. It is also possible to display such numerals in a well balanced manner by preparing the pattern to dislocate the display position to the left and the right. For example, in the display shown "2000" in the FIG. 4a, addresses "0A" and "4A" from FIG. 7 are used to display the same "0". The "4A" is identical in shape with "0A". However, it is displaced to the left by 1 pixel or dot. As a result, it is possible to make a larger space within the display block, and thus the space between the display blocks can be balanced. Therefore, it is possible to arrange the space properly in the total display state to achieve a well balanced and spaced display.

In this embodiment, as shown in FIGS. 5(c) and (d), the numerical pattern including a decimal point is prepared in advance for the display of numerals having a decimal point. With this, it is possible to eliminate the display digit for the decimal point and to save the number of display digits. In addition, in the case of a display including a decimal point, it is possible to show a well balanced display as a whole. In this embodiment, a pattern is prepared, in which the height of the first position numeral of a small value is made small as shown by the address "11". This is to correspond to the custom of displaying the small value smaller with respect to a decimal point, as in the display of an F value in a camera.

Also, in FIG. 7, the addresses from "00" to "7F" include the data for the half em or en display, and addresses from "80" to "FF" are the data for an em display. In the em display patterns after the address "80", the same pattern (in this case symbols and icons) occurs in pairs. This is to make the explanation of this matrix easily understood, because, in actuality, as shown in FIG. 6a, only half of each of the patterns is stored in the memory. For example, the left half of the icon is stored in the first address of the pair and the right half of the icon is stored in the second address of the pair. Therefore, combining the two halves, as shown in FIG. 6b, creates one display pattern (AUTO). In addition, in FIGS. 5(a–d) and FIGS. 6a and b, the dots (".") are blank spaces in actuality. However, "." is displayed in these figures to make the dot placement easily understood.

Additionally, in FIG. 7, all of the dot patterns to indicate the numerals, letters, and icons are included. Any of these can be displayed by designating the appropriate address. In this manner, the patterns not being used are stored in the memory so that a common pattern generator can be used. By doing the above, a reduction in cost can be promoted.

Referring back to FIG. 1, control unit or MCU 10 is equipped with a central process unit (CPU) 101 that accomplishes various types of processes such as monitoring and controlling the camera, ROM (read on memory) 102 that stores programs and various types of constants in memory, RAM (random access memory) 103 that is used for storing various types of data showing the present state of the camera and that is used as a work space for calculations, clock or timer circuit 104, and interface circuit (I/F) 105 that accomplishes the input and output processes with the circuits and associated elements of the remainder of the camera. A program is stored in ROM 102 that executes the commands indicated in the attached flow charts, explained later, which is one component of controlling the functions of the camera. In addition, central process unit 101 includes a timer function. In this embodiment, the timer is used for timer movement, which will be explained later.

The switches SW0 through SW9 are connected to control unit 10 via the input port of interface circuit 105. Switches SW0 through SW8 are preferably placed on the upper surface of body 1 of the camera as shown in FIG. 2. Of course, the switches can be arranged at any convenient location on body 1 that allows a user to easily operate them.

Switch SW0 is turned OFF or ON with each push. SW0 is the mode switch and functions as the mode switch operation component. At OFF, the simple mode is designated, and at ON, the advanced mode is designated. The simple mode selects one branch of parameters from a limited number of optional branches and indicates the simple operation mode that accomplishes the input operation of parameters relative to the selected branch. This is the mode suitable for users who are not accustomed to the camera. In the advanced mode, selection is freely made from a plurality of optional branches of parameters in accordance with the desire of the photographer. This is the mode that accomplishes the input of the parameter relative to the selected branch and is the most suitable mode for users demanding higher functionality.

SW1 is the power source switch. SW2 is the switch corresponding to the left-most position of the LCD display section as seen in FIG. 2 and functions as a change operation component. In actuality, SW2 functions as a menu button to bring up the menu. SW3 through SW6 are the switches corresponding to the four display blocks 311 through 314 previously described, and form the first switch group. The shutter release button includes both SW7 and SW8. SW7 operates with the first stroke of the release button and is a half-depression switch for auto-focus. SW8 operates with the second stroke of the shutter release button, which is full stroke, and is the shutter release switch. SW9 is the back cover switch.

As described, each display block 311 through 314 of dot matrix display section 310 are placed in a horizontal line, as shown in FIG. 2 and FIG. 4a. For that reason, the switches SW3, SW4, SW5 and SW6 of the first switch group are placed in parallel to the display blocks 311 through 314. In addition, switches SW3, SW4, SW5 and SW6 are each placed to correspond with one respective display block. In addition, the symbols for the selected parametric branches displayed on display blocks 311 through 314 correspond with function of switches SW3, SW4, SW5 and SW6 based on the operation of control unit 10.

In addition, the first switch group, namely, SW3 through SW6, are preferably placed on the front right side of the upper surface of body 1 of the camera. Therefore, operation of the switches can be easily accomplished with body 1 in the user's hand. The index finger of the user's hand is naturally positioned to smoothly operate these switches. Switch SW2 is located a short distance from SW3 of the first switch group toward the body center. As a result, when the switch group SW3 through SW6, especially switch SW3, are operated, the danger of accidentally operating the wrong switch, such as SW2, is reduced.

The first switch group SW3 through SW6 and the second switch group SW2, for example, are preferably structured as push-button switches. In this case, the location of the push-button described above can be placed at the frontal direction to the right side of the upper surface of body 1. Of course, the switches are not limited to the push-button type and can be structured as a touch sensitive switch for example.

In addition, the triangle segments of the auxiliary display section 34 described previously function as display elements that optically indicate the corresponding relationship between the symbols of the selected branches displayed on display blocks 311 through 314 and switches SW3, SW4, SW5 and SW6. For that reason, in this embodiment, auxiliary display section 34, as shown in FIG. 2, is placed between display blocks 311 through 314 and switches SW3, SW4, SW5 and SW6 of the first switch group.

In the positional relationship described above, the triangle segments of auxiliary display section 34 function as a graphic pattern suggesting direction. In other words, glancing at the symbols displayed on display blocks 311 through 314, the photographer will select one of the switches above pointed to by triangles 34a, 34b, 34c, 34d and 34f. At that time, if the triangle segment of auxiliary display section 34 is viewed as an arrow, it is possible to make the photographer understand intuitively that the switch located in the direction pointed to by the top of the triangle segment should be pushed.

A state register M 0 and a mode register M 1 are installed in RAM 103 in control unit 10. The memory contents of these registers is determined as shown in Table 2 and Tables 3A and 3B.

TABLE 2

| M 0 | State register | |
|---|---|---|
| 0 | Non-selection state (Execution Screen) | Simple mode |
| 1 | Mode selection state (Selection Screen) | |
| 2 | Function selection state (Selection Screen) | Advanced mode |

In other words, the state register M 0 sets the flag indicating that the display screen being displayed on dot matrix display section 310 is the first display indicating the selected branch, that is, the display screen of the selection possible state (screen offering selections). Alternatively, the flag is set indicating that the display screen is the second display indicating the previously selected mode, that is, the display screen non-selection state (screen confirming the executed operation). In the simple mode, the case of the former, "1" is set to show the possible selection and "0" is set to show the result of the selection. In the advanced mode, an additional option "2" is set when the display screen allows function selection.

TABLE 3A

| | M 1 | |
|---|---|---|
| | Binary | Mode register |
| 0 | 0 0 | Automatic mode |
| 1 | 0 1 | Scenery mode |
| 2 | 1 0 | Portrait mode |
| 3 | 1 1 | Close up mode |

In the most simple form of this invention, one of the four preprogram med modes shown in Table 3A can be selectively set to the mode register. These modes are represented in binary numerals and include the automatic mode, scenery mode, portrait mode and close up mode. These four modes are all program exposure (P) modes. The automatic mode contains the program mode able to combine the most generally used shutter speed and the aperture value. The scenery mode, portrait mode and the close up mode are program modes that select the combination of the shutter speed and the aperture value most effective for the object to be photographed under these circumstances. The selection of one of these preprogrammed modes can be accomplished at the first display. These selections correspond to input parameters designating the operating conditions of the camera.

TABLE 3B

| M 1 | Mode register | |
|---|---|---|
| 0 | P 0: Automatic mode | Simple mode |
| 1 | P 1: Scenery mode | |
| 2 | P 2: Portrait mode | |
| 3 | P 3: Close up mode | |
| 4 | P 4: Sports mode | Advanced mode |
| 5 | P 5: Night view mode | |
| 6 | P 6: Silhouette mode | |
| 7 | P 7: Inspiration mode | |
| 8 | S: Shutter priority mode | |
| 9 | A: Aperture priority mode | |
| 10 | M: Manual mode | |

As seen in Table 3B, a more complex embodiment of this invention offers a total of eleven modes from 0 to 10 shown in Table 3B to be set selectively with binary numerals to the mode register M1. In other words, in the simple mode, one of the program (P) modes can be selected from the automatic mode P 0, the scenery mode P 1, the portrait mode P 2 or the close up mode P 3.

In addition, in the advanced mode, one of the following modes can be selected in addition to those modes described above: the sports mode P 4, the night view mode P 5, the silhouette mode P 6, the inspiration mode P 7, the shutter priority mode S, aperture priority mode A and the manual mode M. This selection can be accomplished at the first display as a rule. These selections correspond to parameters input into the camera, such as data that indicates the operation conditions of the camera.

Furthermore, control unit 10 structures the command column on RAM 103, which accomplishes the serial transfer to LCD driver 20, an example of which is shown in Table 4. As shown in Table 4, the command column is structured with 12 bytes from D 0 to D 11. Each byte from D 0 to D 11 is serially transferred in that order. Each of the positions corresponds to display units 31*a* through *h* of dot matrix display section 310 and segments 32, 33, 34, 35, 36 and 37. The data for display of each display section are stored in each byte.

TABLE 4

| MCU Data | Command | Contents |
|---|---|---|
| D 0 | 1 byte | Dot matrix 31a display data |
| D 1 | 2 | Dot matrix 31b display data |
| D 2 | 3 | Dot matrix 31c display data |
| D 3 | 4 | Dot matrix 31d display data |
| D 4 | 5 | Dot matrix 31e display data |
| D 5 | 6 | Dot matrix 31f display data |
| D 6 | 7 | Dot matrix 31g display data |
| D 7 | 8 | Dot matrix 31h display data |
| D 8 | 9 | Segment 32 display data |
| D 9 | 10 | Segment 33 display data |
| D 10 | 11 | Segment 34–36 display data |
| D 11 | 12 | Segment 37 display data |

In the case of data for the dot matrix display section from D 0 through D 7, D 0 is described for the display unit 31*a*, D 1 is described for the display unit 31*b* and so on. In the manner above, the memory address of the pattern corresponding to pattern generator 23 is described.

In addition, in the case of data for segment display from D 8 through D 11, the segment to be lighted in each corresponding segment display sections 32, 33, 34, 35, 36, and 37, is described by the data designated by the coordinated bit. In other words, D 8 accomplishes the lighting of the segments a through g of segment display section 32 using the bits 0 through 6. D 9 accomplishes the lighting of the segments a through g of segment display section 33 using the bits 0 through 6. D 10 accomplishes the lighting of the segments a through f of auxiliary display section 34 using the bits 0 through 5, and the lighting of memory mode display section 36 and exposure auxiliary display section 35 is accomplished using the bits 7 and 6. In addition, D 11 accomplishes the lighting of the segments a through h of mode display section 37 using bits 0 through 7.

Further, in the case that 0 and 1 are transferred alternately with a certain cycle, each bit of D 8 through D 11 from Table 4 is capable of accomplishing the flash display corresponding to its cycle.

In the command example shown in Table 4, block display sections 311 through 314 are driven with the half em display unit. However, the present invention is not limited to the above. It is also possible to form the display pattern with an em.

For example, as shown in Table 5, it is possible to make the command row of 7 bytes from D 0 through D 6. In the example in the same table, the character pattern address to be displayed on display block 314 with D 0, the character pattern address to be displayed on display block 313 with D 1, the character pattern address to be displayed on display block 312 with D 2 and the character pattern address to be displayed on display block 311 with D 3 are transferred. In addition, the data of D 4 being indicated corresponding to the bit to be lighted among triangle segments 34*a*, 34*c*, 34*d* and 34*f* of auxiliary display section 34, the data of D 5 corresponding to the bit to be flashed among triangle segments 34*a*, 34*c*, 34*d*, and 34-*f*, and the data of D 6 showing the numerical values 0 through 99 indicating the number of film frames and the segment to E indicating the final frame are transferred.

TABLE 5

| Command | Contents | Display |
|---|---|---|
| D 0 | Dot display right-most | Dot display by Table 4 |
| D 1 | Dot display central right | Dot display by Table 4 |
| D 2 | Dot display central left | Dot display by Table 4 |
| D 3 | Dot display left-most | Dot display by Table 4 |
| D 4 | Arrow display | Every bit ▲▲▲▲ display |
| D 5 | Flashing flag | Every bit ▲▲▲▲ flashing |
| D 6 | Film frame No. display | 0 through 99, E |

In this example, the character pattern is displayed with a total em unit. Therefore, pattern generator 23 reads two pieces of character data in half em comprising a pair based on the transferred data, and this should be displayed on one of the display blocks. In addition, the character generator stores the memory relating only to the necessary pattern. It is therefore possible to reduce the memory capacity. It is also possible to store using a total em, not using a half em. The address can be reduced by storing the memory with a total em unit.

Table 6 is one of the examples described above. In other words, the following can be stored: a blank in address "00", the icon of a camera indicating the automatic mode in address "80", the icon of a mountain indicating the scenery mode in address "81", the icon of a profile indicating the portrait mode in address "82", and the icon of a flower indicating the close up mode in address "83". These can be output by designating the address. In this example, only the icons from "80" through "83" are shown. However, it is possible to store other graphic patterns also. It is also possible to reduce the memory capacity by reducing the number of icons.

TABLE 6

| Address | Character generator |
|---|---|
| 0 | Blank |
| 80 | Automatic mode display |
| 81 | Scenery mode display |
| 82 | Portrait mode display |
| 83 | Close up mode display |

The mode register M 3 for memory is prepared to RAM 103 and EEPROM 16 in the identical format with Table 3B. When the menu button (SW2) is continuously pushed for a certain time, for more than 1 second in this embodiment, the mode is converted to the program mode (P) (referred to as an automatic jump herein). In addition, if the desirable mode among the modes shown in Table 3B is stored in the memory, the mode can be switched over to the mode stored in the memory at the time of the automatic jump. The mode register M 3 for memory is the register for storing the memory of that mode. However, RAM 103, which structures the internal memory of MCU 10, loses the contents when the power source is cut off. Therefore, when the power source is cut off, the contents of mode register M 3 for this memory is saved into EEPROM 16. Especially, in the case that the contents are not saved in the memory, the automatic mode is set corresponding to 0 of the initial value. This has the highest generality.

Figure 20:
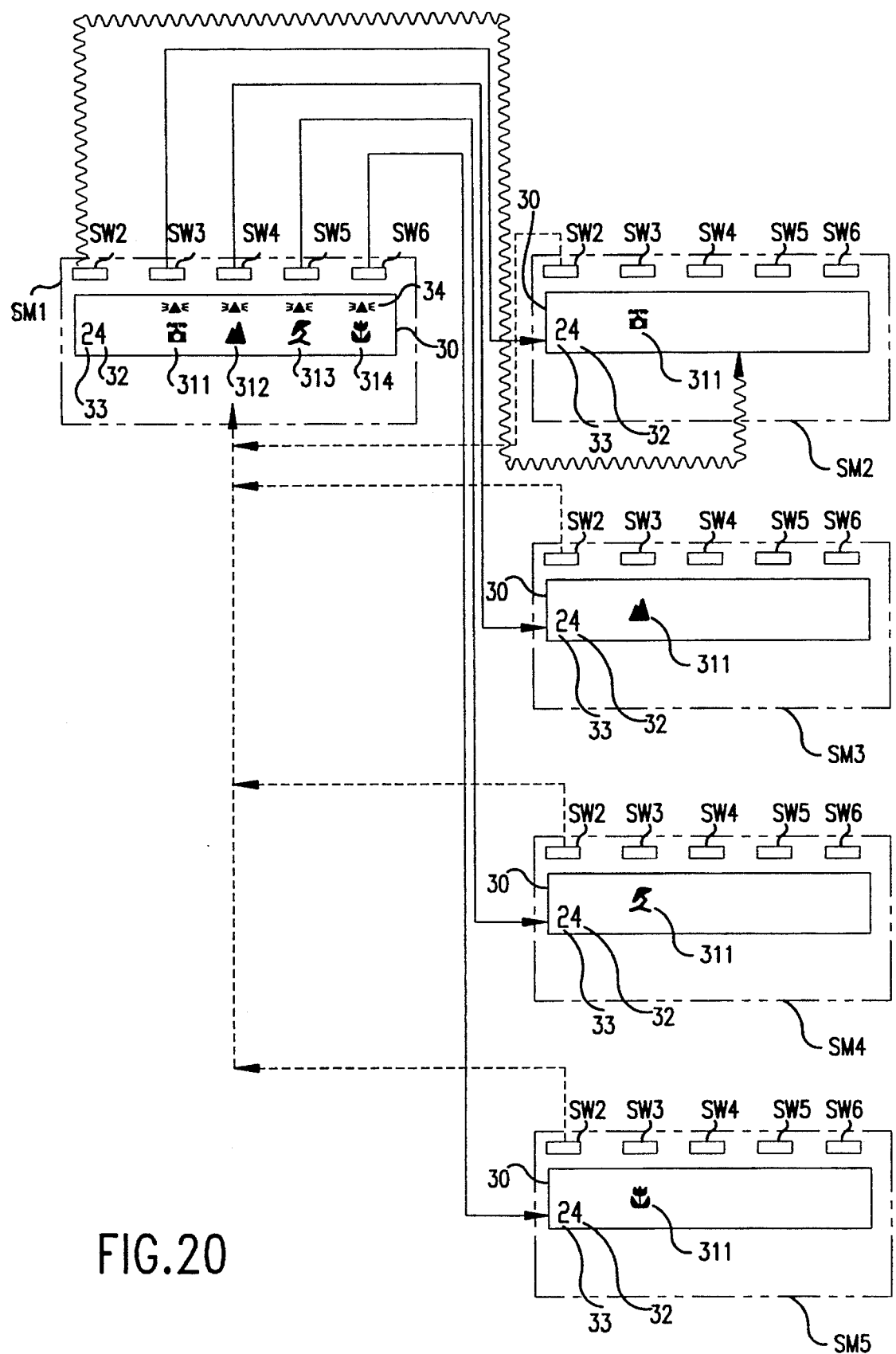
FIG. 20 is an explanatory diagram showing the corresponding relationship between the display and the selection operations in the simple mode in an embodiment according to this invention.
Figure 21A:
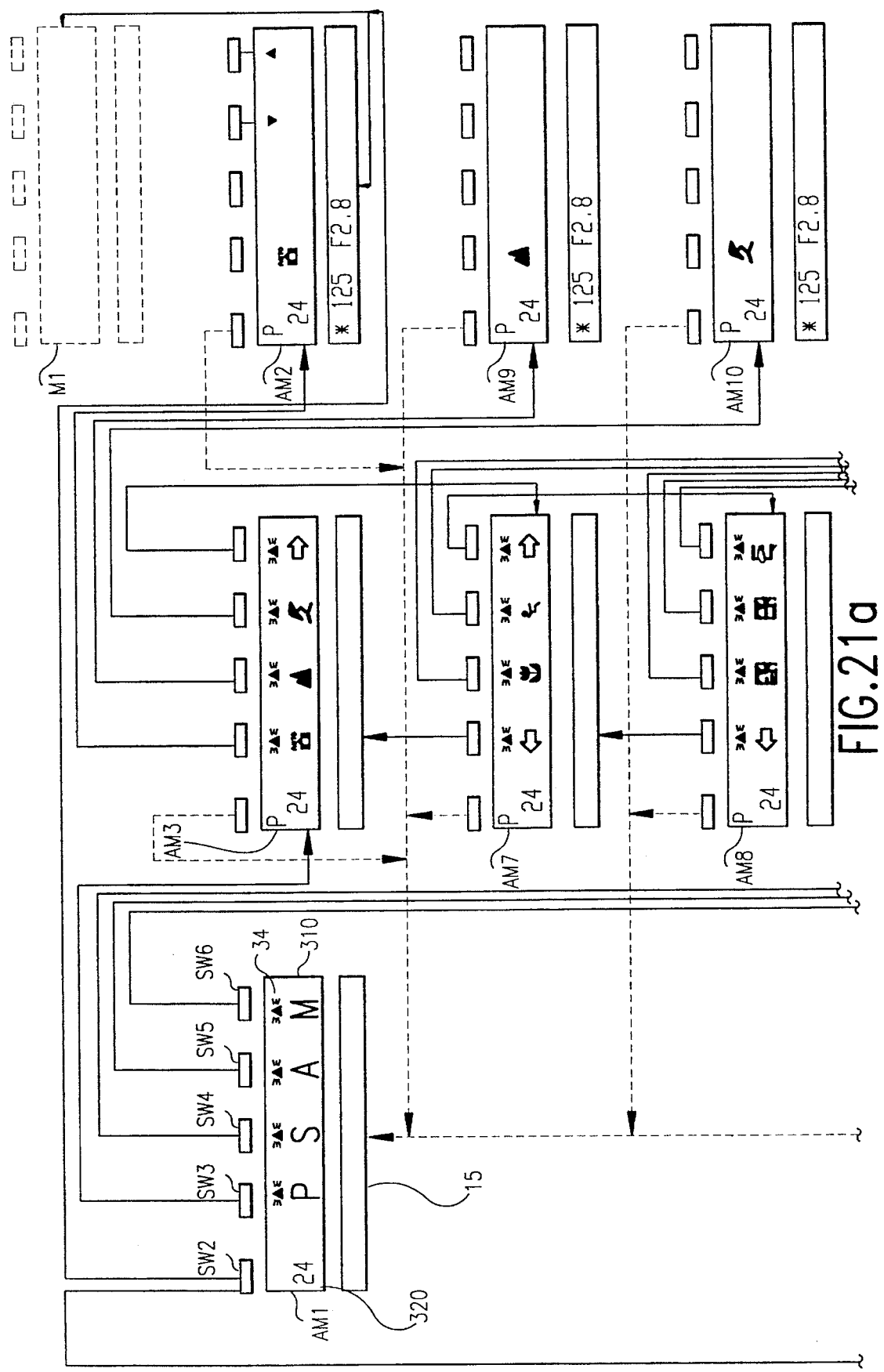
FIGS. 21a–d are an explanatory diagram showing the corresponding relationship between the display and the selection operations in the advanced mode in an embodiment according to the present invention.
Figure 21B:
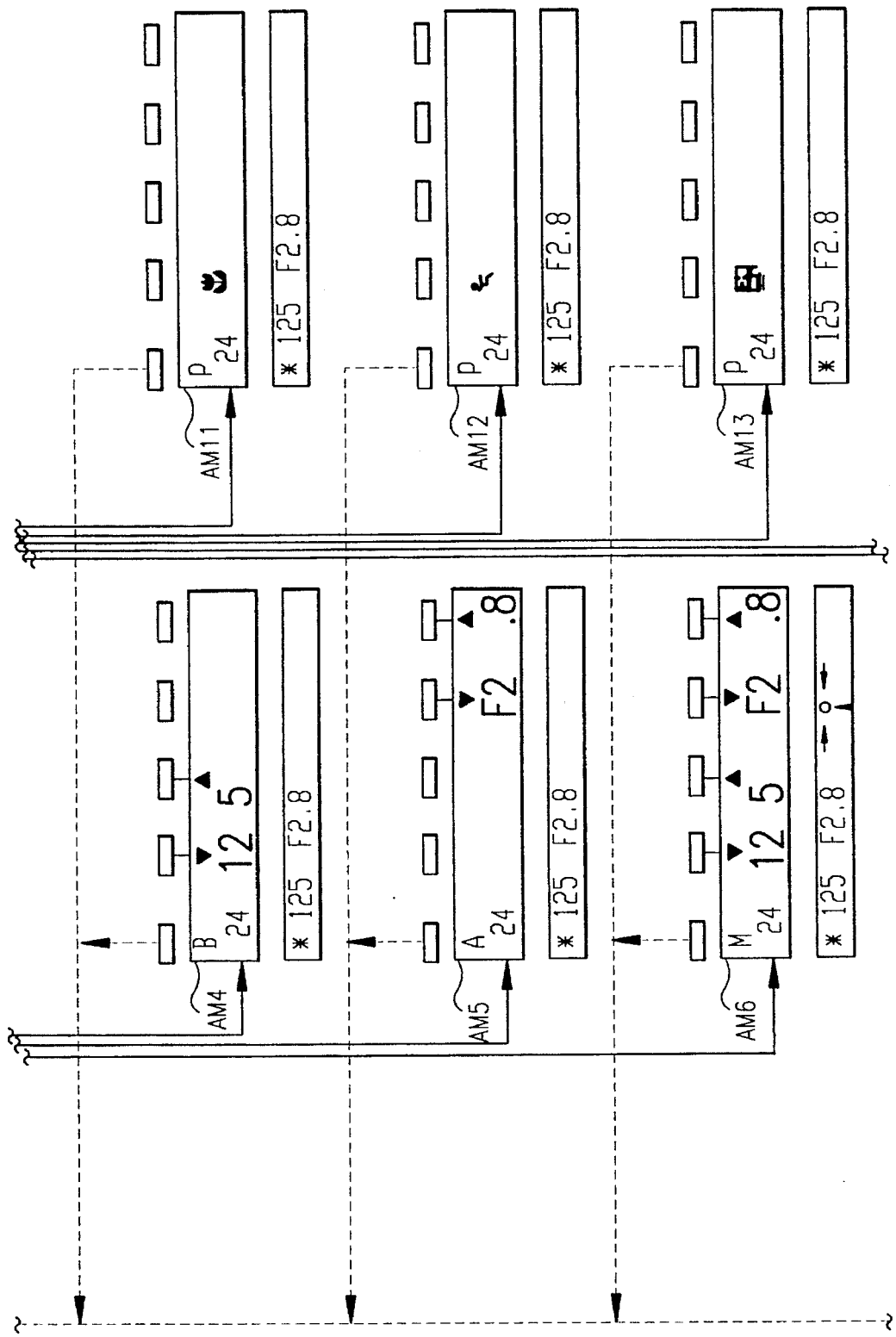
Figure 21C:
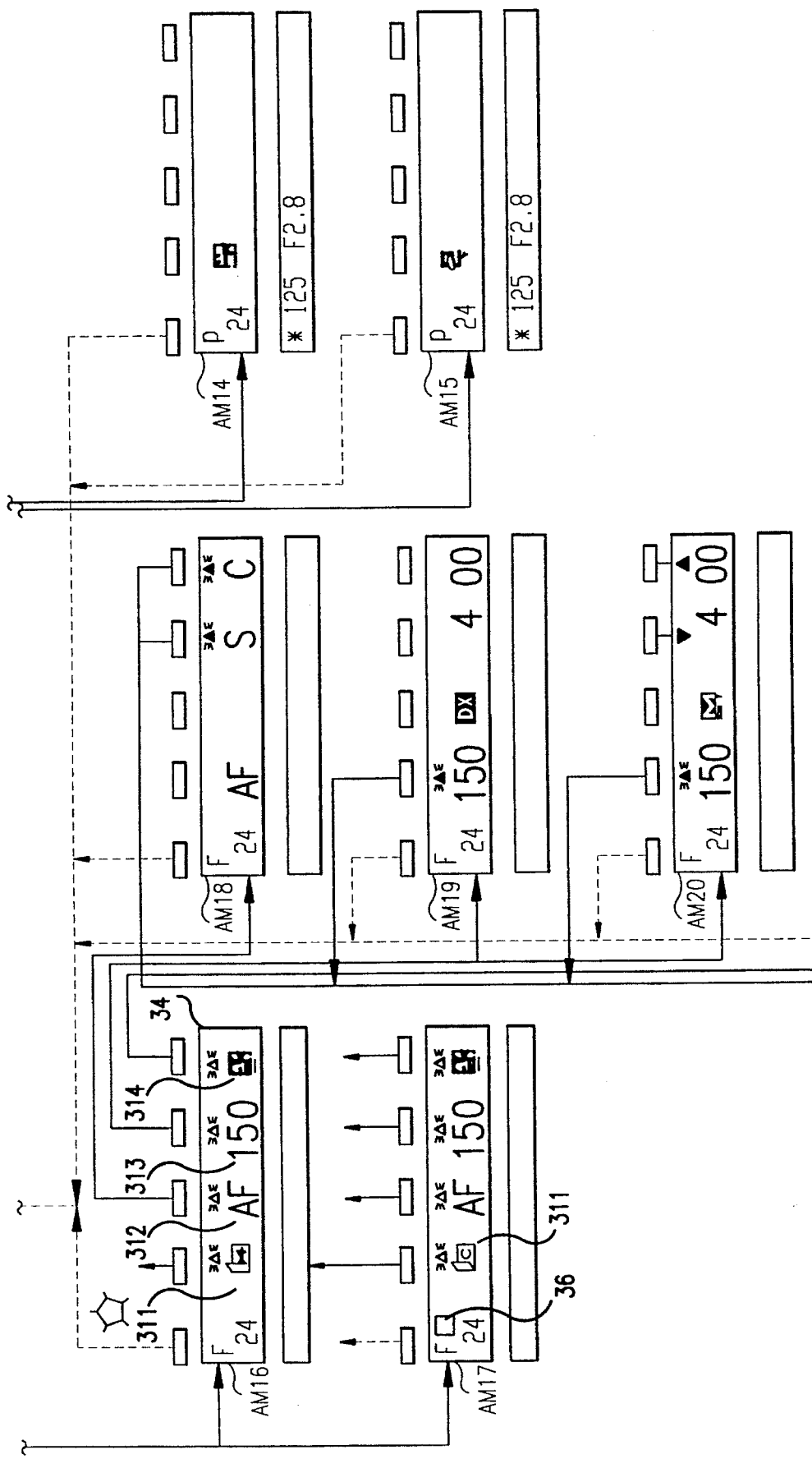
Figure 21D:
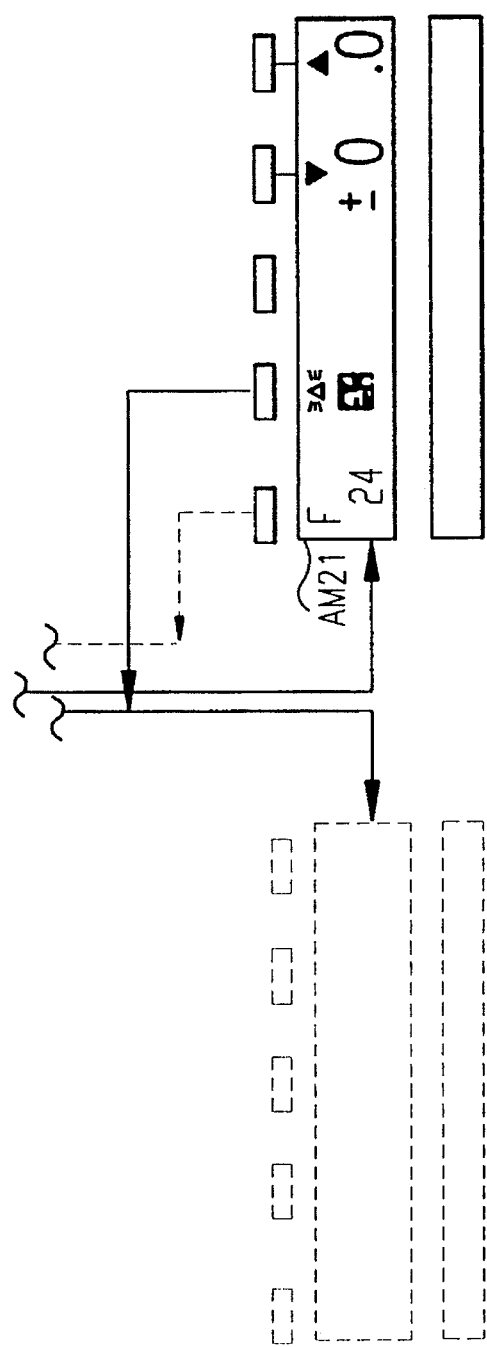

The operation of this embodiment is explained hereafter, with reference to the previously described FIGS., the flow charts in FIGS. 8 through 15, and the display examples shown in FIGS. 20, 21 and 22. In this embodiment, various types of parameters that designate the operation of the camera, for example, the designation of the exposure mode, aperture value, shutter speed, etc. shown in Table 3B above, as the parameters will be explained.

In this embodiment, control unit 10 executes the menu display (the first display) process in order to select the parameter. Control unit 10 also executes processes of selection in the further subordination hierarchy after the initial selection, the implementation process of the selected branch, the change of the input mode, and the skip process to the specific mode. In addition, control unit 10 accomplishes the process of setting the film sensitivity.

In this embodiment, it is possible to select the simple mode and the advanced mode by operating mode switch SW0, which functions as the mode switch operation component. The corresponding relationship of the display and the switch may differ according to the mode. However, the selected input of numerous information is basically possible in both simple and advanced modes by using the same display panel, in the same display mode, with the same switch group, and by operating the switches in the same manner. Furthermore, since a symbol is used to indicate the selected parametric branch, in one display block at a time, it is easily seen and selected.

In this embodiment, the role accomplished by the first switch group in each mode, for example, is that shown in Table 7 and Table 8.

Table 7 shows the role accomplished by SW3 through SW6 in the implementation image screen of the advanced mode.

TABLE 7

| M 1 | Advanced mode | SW3 | SW4 | SW5 | SW6 |
|---|---|---|---|---|---|
| 0 | Program mode | | | −½ program shift | +½ program shift |
| 1 | | | | | |
| 7 | | | | | |
| 8 | Shutter priority mode | TV − ½ | TV + ½ | | |
| 9 | Aperture priority mode | | | AV − ½ | AV + ½ |
| 10 | Manual mode | TV − ½ | TV + ½ | AV − ½ | AV + ½ |

Table 8 shows the roles of SW3 through SW6 in the selection display screen of the simple mode.

TABLE 8

| | SW3 | SW4 | SW5 | SW6 |
|---|---|---|---|---|
| Simple mode | P 0 selection | P 1 selection | P 2 selection | P 3 selection |

In this embodiment, the state of the display image screen being displayed on dot matrix display section 310 is placed on RAM 103 by image screen register M 2. Table 9 shows the functions of SW3 through SW6 corresponding to the image screen register M 2 at the time of advanced mode. Note that there is no purpose for the image screen register M 2 at the time of simple mode.

TABLE 9

| M 2 | Display screen register | SW3 | SW4 | SW5 | SW6 |
|---|---|---|---|---|---|
| 0 | Mode selection First display screen | M 2 ← 1 | S selection | A selection | M selection |
| 1 | P 0–P 2 selection display screen | P 0 selection | P 1 selection | P 2 selection | M 2 ← 2 |
| 2 | P 3, P 4 selection display screen | M 2 ← 2 | P 3 selection | P 4 selection | M 2 ← 3 |
| 3 | P 5–P 7 selection display screen | M 2 ← 2 | P 5 selection | P 6 selection | P 7 selection |
| 4 | Function | M 2 ← 0 | M 2 ← 5 | M 2 ← 6 | M 2 ← 7 |

TABLE 9-continued

| M 2 | Display screen register | SW3 | SW4 | SW5 | SW6 |
|---|---|---|---|---|---|
| | First display screen | M 2 ← 4 | | | |
| 5 | AF mode setting display screen | | | AF - S | AF - C |
| 6 | Film sensitivity setting display screen | Setting completed | | SV − ⅓ | SV + ⅓ |
| 7 | Exposure adjustment setting display screen | Setting completed | | dSV − ⅓ | dSV + ⅓ |

The corresponding relationship of the display and the switch operation in display panel 30 is shown in FIG. 20 through FIG. 22C.

FIG. 20 shows the display possibilities in the simple mode. In FIG. 20, the small rectangular shaped blocks shown at the upper section of display panel 30 represent switches SW2 through SW6. FIGS. 21a–d and 22a–c show the display possibilities of the advanced mode. In addition, in FIGS. 21a–d and 22a–c the icons being displayed are small. Therefore, each element in these figures is not labelled other than for the cases specially indicated. Hence, reference should also be made to FIG. 20 when viewing FIG. 21a–d and 22a–c for the common display elements. In addition, in FIGS. 21a–d and 22a–c the rectangular shaped block at the lower section of the display panel is finder display unit 15. Also, in FIGS. 20–22C the connecting lines indicate the selected moving location when switches SW2 through SW6 are ON in each state of display panel 30. The dotted line indicates the return to the first display state when switch SW2 is ON in each state of the second display of display panel 30. The wavy line indicates the moving location when switch SW2 is pushed for a certain period of time and when it is in the ON state.

In FIG. 20, SM1 indicates that the state register M 0 shown in Table 2 is "1". In other words, this indicates the first display. In this mode, each symbol of the basic program mode in mode 1 register M1 is displayed in display blocks 311 through 314, including the camera icon with AUTO letters for the automatic mode P0, the mountain icon for the scenery mode P1, the profile icon for the portrait mode P2, and the flower icon for the close up mode P3. These are displayed in one of the selection possible modes. To indicate that selection is possible in this embodiment, a triangle segment flashes, which corresponds to auxiliary display section 34. In addition, in segment display sections 32 and 33, numerals with two digits are displayed indicating and the number of film pieces.

Each display screen SM2 through SM5 in FIG. 20 represents the second display, which shows the results of the selected mode corresponding to one of the display blocks in the first display. In other words, SM2 indicates the display screen of the automatic mode. SM3 indicates the display screen of the scenery mode. SM4 indicates the display screen of the portrait mode. SM5 indicates the display screen of the close up mode. In this state, the mode register M 0 is "0". When switch SW2 is pushed here, the second display is canceled and control unit 10 returns to the first display shown in SM1.

In addition, in SM1 of FIG. 20, if switch SW2 is continuously pushed for a certain time (for example, 1 second), control unit 10 moves into the automatic mode of SM2.

When the advanced mode is selected by switch SW0 the following occurs. In this case, first of all in general, the display screen of the mode selected immediately before is displayed on panel display section 30. Therefore, the photographer can photograph in the previously selected mode. However, if the mode is changed, or, if switch SW2 (which is the change operation component) is depressed, it is possible to return to the initial display screen. This initial display screen is SM1 in FIG. 20.

As shown in FIG. 21a–d in this display screen AM1, the letter indicating each selected branch of the program mode P, the shutter priority mode S, the aperture priority mode A or the manual mode M is displayed on dot matrix display section 310. To indicate that these can be selected, the triangle segments of auxiliary display section 34 flashes. The photographer is then able to select one of the modes in this state.

If the photographer continuously depresses the switch SW2 for more than a designated period of time, control unit 10 moves into the display mode of AM2 shown in FIG. 21. In this case, when the photographer stores a specific mode into the memory in advance, as shown in a broken line, it moves into the mode M1 stored in the memory. In the case that the specific mode is not stored in the memory, it moves into the automatic mode. RAM 103 is used as the memory. However, when the power source is cut off, the contents are saved in to EEPROM. At the initialization of the power source (ON), the contents are read to RAM 103. Therefore, the immediately previously used data is maintained in the same manner.

On the other hand, if the photographer, in the display of AM1, selects one of P, S, A, or M, using switches SW3 through SW6, control unit 10 moves to the display screen of AM3, AM4, AM5 or AM6. In each of the screens, each letter is displayed on mode display section 37 shown in FIG. 4a.

In each display screen AM4, AM5 and AM6, the shutter speed and the aperture setting are determined, and this selection input is completed. On the other hand, in screen AM3, the arrow icon indicating that there are more selection branches is displayed at the right-most side of dot matrix display section 310. If switch SW6 corresponding to the arrow icon is pushed, control unit 10 moves to the next screen AM7. Furthermore, if switch SW6 is pushed at screen AM7, control unit 10 moves to the next screen AM8. In display screen AM8, in the reverse manner, switch SW3 is pushed to move to the previous display screen AM7. Further, when switch SW3 is pushed again, it moves to the previous display screen AM3. An icon other than the arrow icon can be selected in each display screen AM3, AM7 and AM8 to move to one of the display screens AM2, AM9, AM10, AM11, AM12, AM13, AM14 and AM15 corresponding to each switch. These display screens correspond to possible program modes P 0 through P 7 set to the mode register M 1.

On the other hand, if switch SW2 is depressed in the display screen AM1, control unit 10 moves to the function input display screen AM16 or AM17 to execute the storage operation. When the photographer has not stored a desired mode, the process moves to AM16. When the photographer has stored a desired mode (the memory mode display section 36 is flashing), control unit 10 moves to AM17. In display screen AM17, when switch SW3 corresponding to display block 311 is depressed, all modes stored up to that point are cleared, and the process moves to display screen AM16. In addition, in AM17, display block 312 through 314 contain the identical functions as display screen AM16.

In display screen AM16, when display block 311 is selected, control unit 10 moves to the display screen AM22 of FIG. 22 (indicated by a star), and the desired mode is stored. When display blocks 312, 313 and 314 are selected, the process moves to one of the display screens AM18, AM19, AM20 and AM21, corresponding to each. These are the display screens used to accomplish the input functions. The selection of one of the single mode S and the continuous mode C for AF (automatic focus) is done in AM18. The film sensitivity setting by automatic operation for DX is set in AM19. In AM20, the film sensitivity is manually set. The exposure adjustment is accomplished in AM21. The film sensitivity setting is automatically switched between AM19 and AM20 depending on the readability of DX. The setting is established, and the setting value is stored in the memory by depressing the switch corresponding to the display block displaying each symbol after setting the numerical values using the corresponding switch at each of the display screens. This value is maintained unless a change is made. In other words, these values are saved in the EEPROM 16 when the power source is cut off.

Figure 22A:
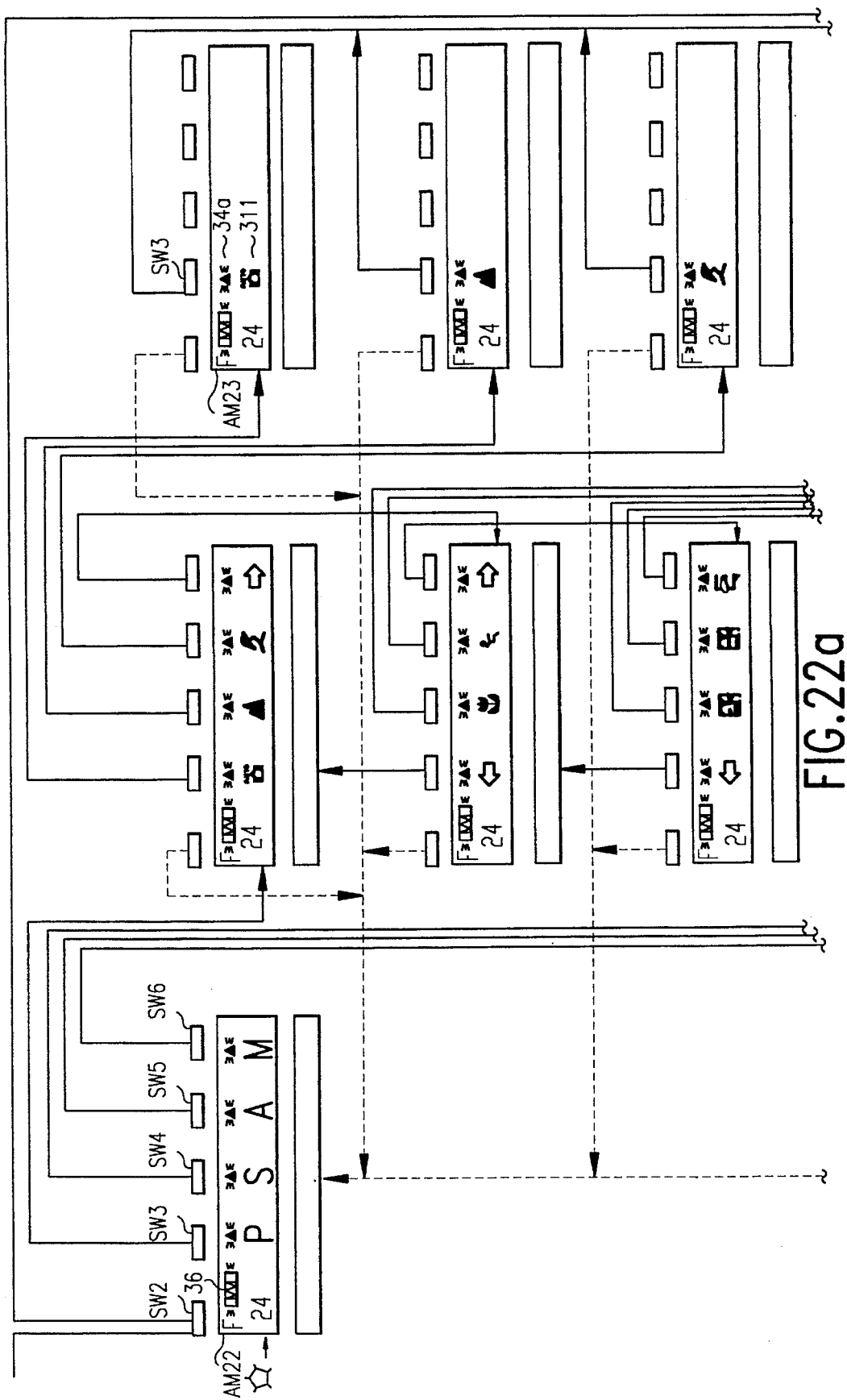
FIGS. 22a–c are an explanatory diagram showing the corresponding relationship between the display and the selection operations when the memory registration is accomplished in the advanced mode described in FIG. 21.
Figure 22B:
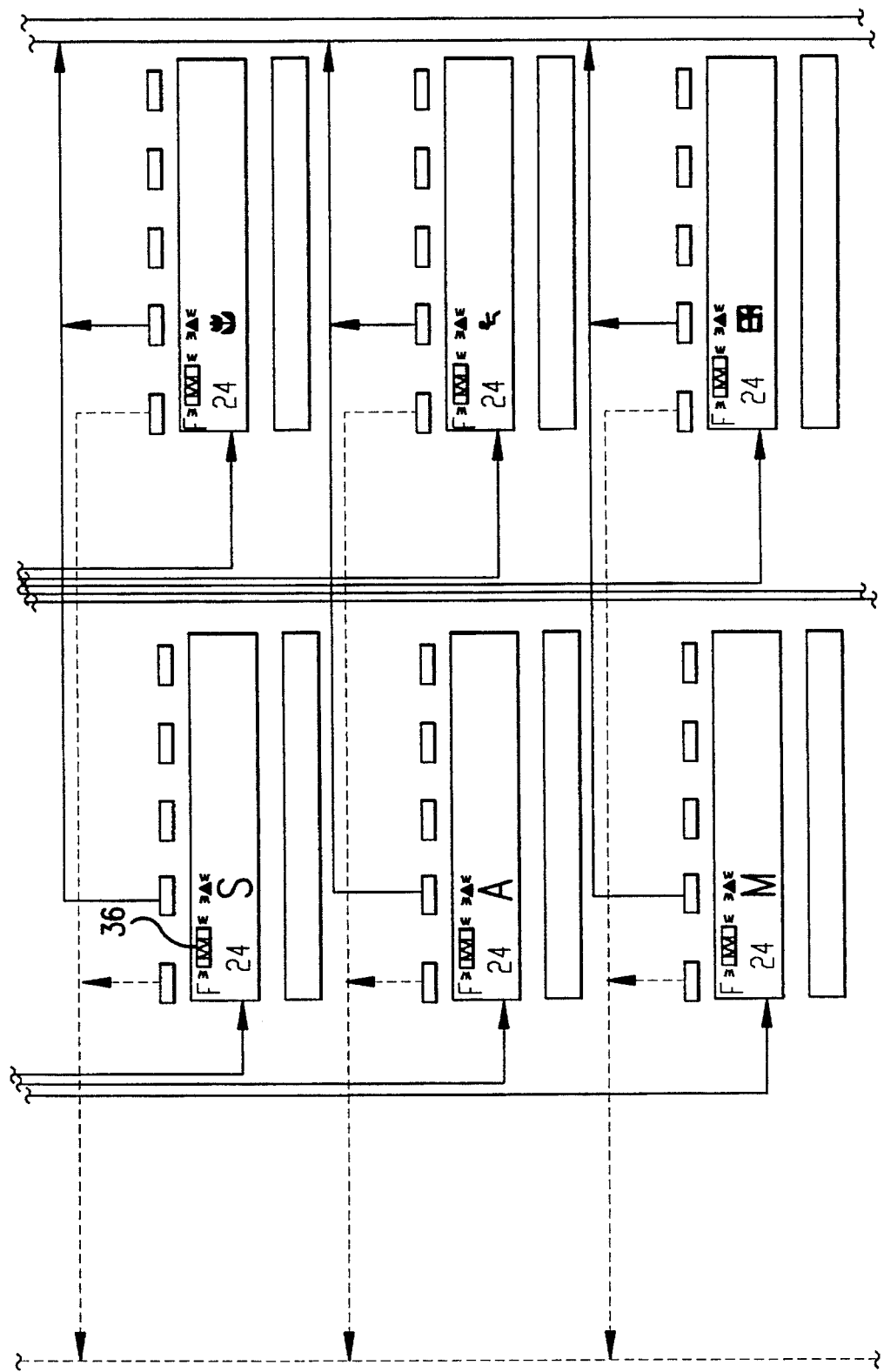
Figure 22C:
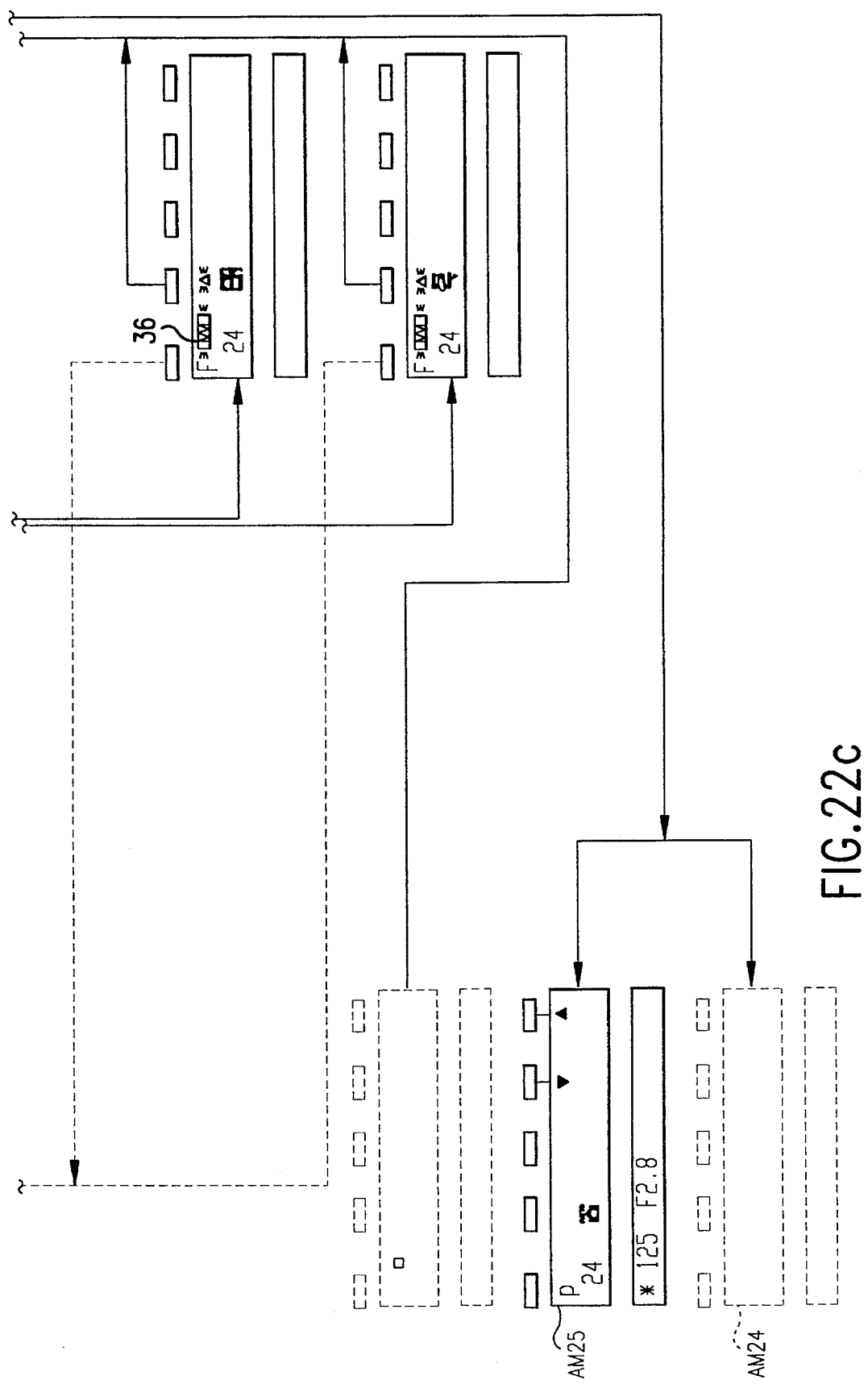

With FIG. 22a–c the selection of each mode to be stored is accomplished in the initial display screen AM22. The display on the screen is same as in AM1, except that memory mode display section 36 is flashing. Here, the mode selection to be stored is accomplished in the identical manner as the mode selection in FIG. 21 described previously. In other words, one of P, S, A or M is selected, and the mode displayed on the display screen is stored by depressing the switch corresponding to the triangle segment flashing. For example, when the display screen AM23 is finally selected, if switch SW3 is operated while triangle segment 34a of the auxiliary display section is flashing, the automatic mode is registered. The same can be applied for other modes.

When the storage is completed, control unit 10 moves to the exposure mode immediately before the storage operation is accomplished. In addition, if switch SW2 is continuously depressed in the display screen AM22, control unit 10 moves to AM24 where the storage is accomplished. In addition, control unit 10 moves to the automatic mode of the display screen AM25, in the case prior to storage.

Figure 8:
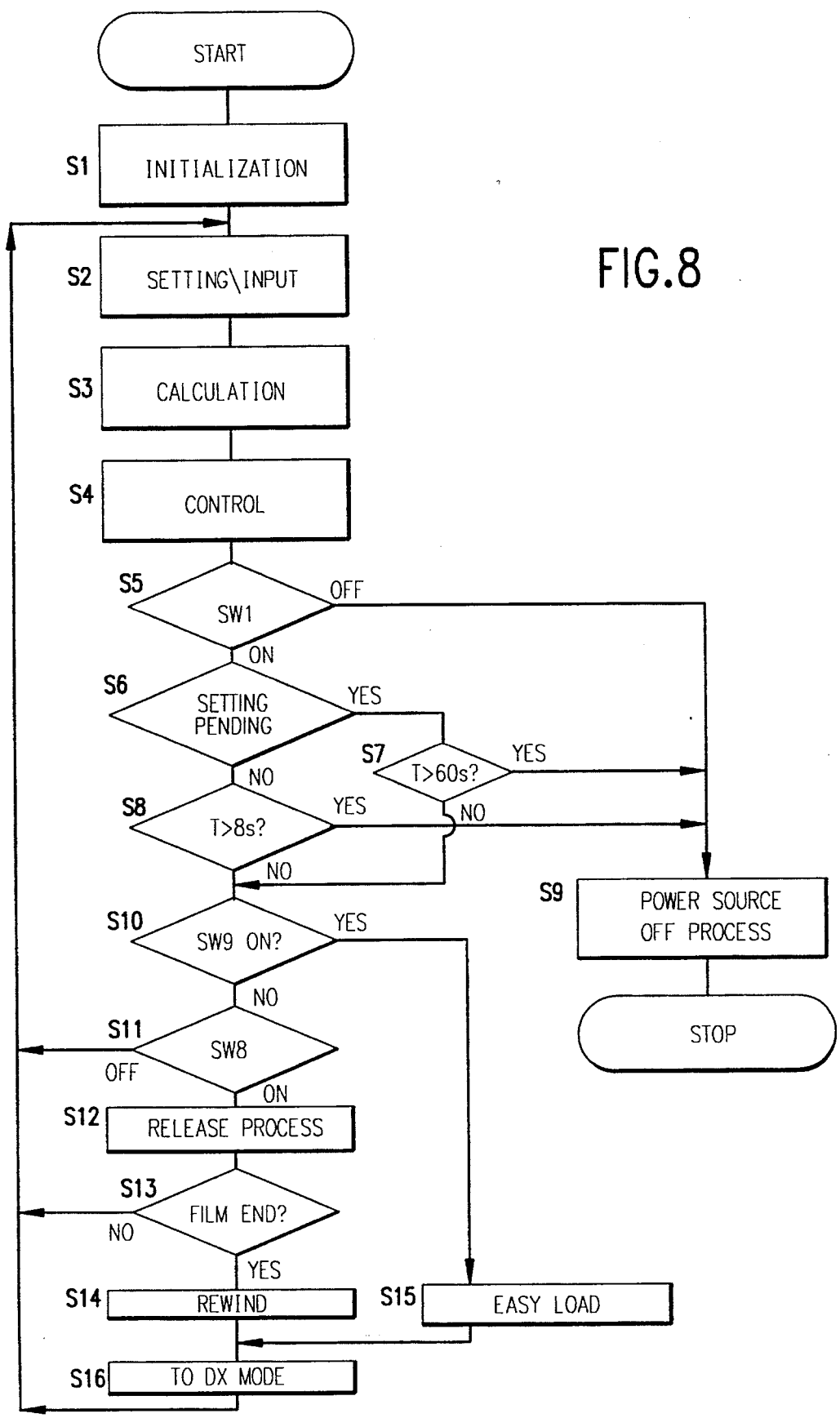
FIG. 8 is a flow chart showing the main routine of the control device in an embodiment according to this invention.

Referring to the flow charts of FIGS. 8–15, the processes of inputting the mode selection, inputting the function selection and storing the mode are further explained. FIG. 8 is a flow chart of the main routine of control unit (MCU) 10.

When SW2 or SW7 is depressed, a signal is input to MCU 10, which is in the stand-by mode (wherein only a minute quantity of electric current is flowing), and the process is started from Step 1 (hereafter, the steps are referred to as "S.")

At S1, MCU 10 is initialized. Power source circuit 11 is set at ON, electricity is connected to the total circuit, the main clock of timer of MCU 10 is set at ON, and the data in EEPROM 16 is read and transferred to the designated RAM in MCU 10.

At S2, switch SW2 or SW7 is operated to accomplish the input to MCU 10, and the setting operation is accomplished. Signals output from photometric circuit 12, telemetric circuit 13, or DX contact point 14 are input into MCU 10 and stored in the designated RAM 103. In addition, in this embodiment, a power source check is accomplished at this step. It is also possible to activate a power warning range, if there is a pre-designated voltage range. This warning, for example, can be displayed from the characters shown in FIG. 7 to display panel 30, for example, by designating the address DC and DD symbols, and the address D6 and D7 symbols. In addition, in some cases, it is possible to prohibit the release.

At S3, the exposure or distance is calculated in accordance with the data mode of RAM 103 obtained at S2. In addition, in this embodiment, not shown in figures, when the output from photometric circuit 12 indicates low luminosity in this step, it is possible to activate a warning, such as recommending the use of a strobe.

At S4, various types of control are accomplished. Specifically, the following control operations are accomplished: AF control, which controls first motor control device 17, or the display control, which drives the display device in finder display 15 or LCD driver 20.

At S5, the ON-OFF state of main switch SW1 is examined. If it is ON, the process proceeds to S6. If it is OFF, the process goes to S9.

At S6, the settings are checked. When the flag indicates that setting is pending, the process proceeds to S7. When the flag indicates the completion of setting, the process proceeds to S8.

At S7 or S8, the power source maintenance timer value is checked against specific values (in this case, 60 seconds at S7 and 8 seconds at S8.) The maintenance timer has been previously cleared when switches SW2 through SW7 are detected ON with the setting input process of S2. When one of these switches has not been operated, the power source maintenance timer goes forward. When the time detected by the maintenance timer exceeds the designated value, the process proceeds to S9. When one of the switches SW2 through SW7 is activated and set at ON, the timer is cleared. Therefore, the timer does not go over the designated value. In such a case, the process proceeds to S10.

As noted above, the designated value is set at 60 sec in S7, and in this embodiment, the designated value is set at 8 sec in S8. In other words, while the setting is pending, the power source maintenance timer is set at 60 sec in order to prevent the power source from turning OFF during setting. During the non-setting mode (viewing the display screen) after the setting is complete, the power source maintenance timer is shortened by setting it at 8 sec. Thus, electric power can be saved. In the same SW2 through SW7 operations, merely the time for the change of the setting value is shortened as in the viewing of the display screen. Especially, when an unaccustomed user operates the camera, setting may take longer, which is taken into consideration when setting the maintenance timer. However, if an experienced user operates the camera, setting can be accomplished quickly. In that case, the camera will switch to the implementation display screen once setting is complete without waiting for the time to elapse. Therefore, power source maintenance time can be shortened.

At S9, the data to be stored in the memory are saved in the EEPROM 16 even after the power source is cut off. The power source control circuit 11 is then driven, and the power source OFF process is accomplished.

At S10, the activation of back cover switch SW9 is checked. When the back cover is closed and its activation is detected, the process goes to S15. Then, easy loading of the film, which is the film automatic installation function, is accomplished. When back cover switch SW9 is in the open position or after the easy load is accomplished, activation of SW9 is not detected. Therefore, the process proceeds to S11.

At S11, ON-OFF of shutter release switch SW8 is checked. If it is OFF, the process goes back to S2 and the steps are repeated. If it is ON, the process goes to S12.

At S12, the shutter release processes are accomplished by controlling second motor control circuit 18 or by controlling exposure control circuit 19.

At S13, the quantity of film supply is checked. If winding one frame of film is not accomplished, the film is considered to be at the end, and the process goes forward to rewind S14. When the winding of one frame of film is accomplished, the process goes back to S2.

At S14, rewinding is accomplished using the supply mechanism and driving second motor control circuit 18. When the rewinding is completed, the process goes forward to S16.

At S15, when the winding of the designated quantity of film is accomplished and the easy load is implemented by driving the second motor driving device, the process also goes forward to S16.

Proceeding to S16 from S14 or S15, the manual ISO setting is cleared. In other words, the switch over to DX mode is accomplished, in which the manually set film sensitivity is invalid and the film sensitivity set by the DX film code is valid. In addition, at this time, the initial value of the film sensitivity is set at ISO 100, which is the most standard sensitivity. Until the switch over to DX mode is made, however, the setting itself does not become valid. The setting will appear as the initial manually set value on the setting display screen. Then, the process returns to S2.

When the process returns to S2, for all of the above described cases, the same processes are repeated.

Figure 9:
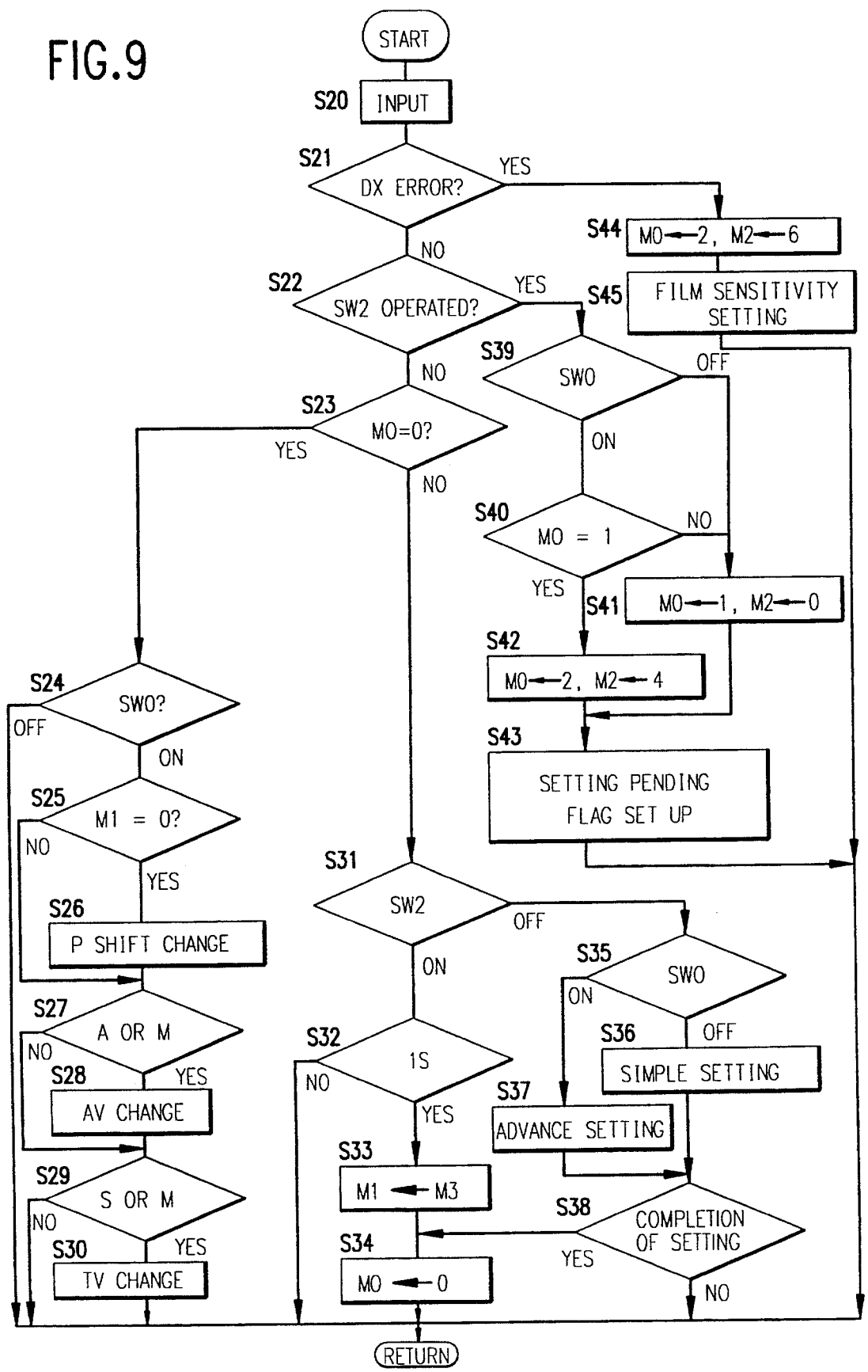
FIG. 9 is a flow chart showing the setting process sub-routine implemented at the setting process of the main routine of FIG. 8.

FIG. 9 is a sub-routine of the setting process routine, which occurs when the setting and input processes of S2 in FIG. 8 are accomplished.

At S20, if the input of SW2 through SW7 are received and one of the switches is set at ON, the power source maintenance timer, checked at S7 or S8 of FIG. 8, is cleared.

At S21, the readable film sensitivity data is read from the conductor section of the film coming from DX contact point 14 and DX error is checked. When it is determined that the film is not DX film (DX error), the DX error flag is set up, and the process proceeds to S44. If it is determined that the film is DX film, the process goes to S22.

Figure 11:
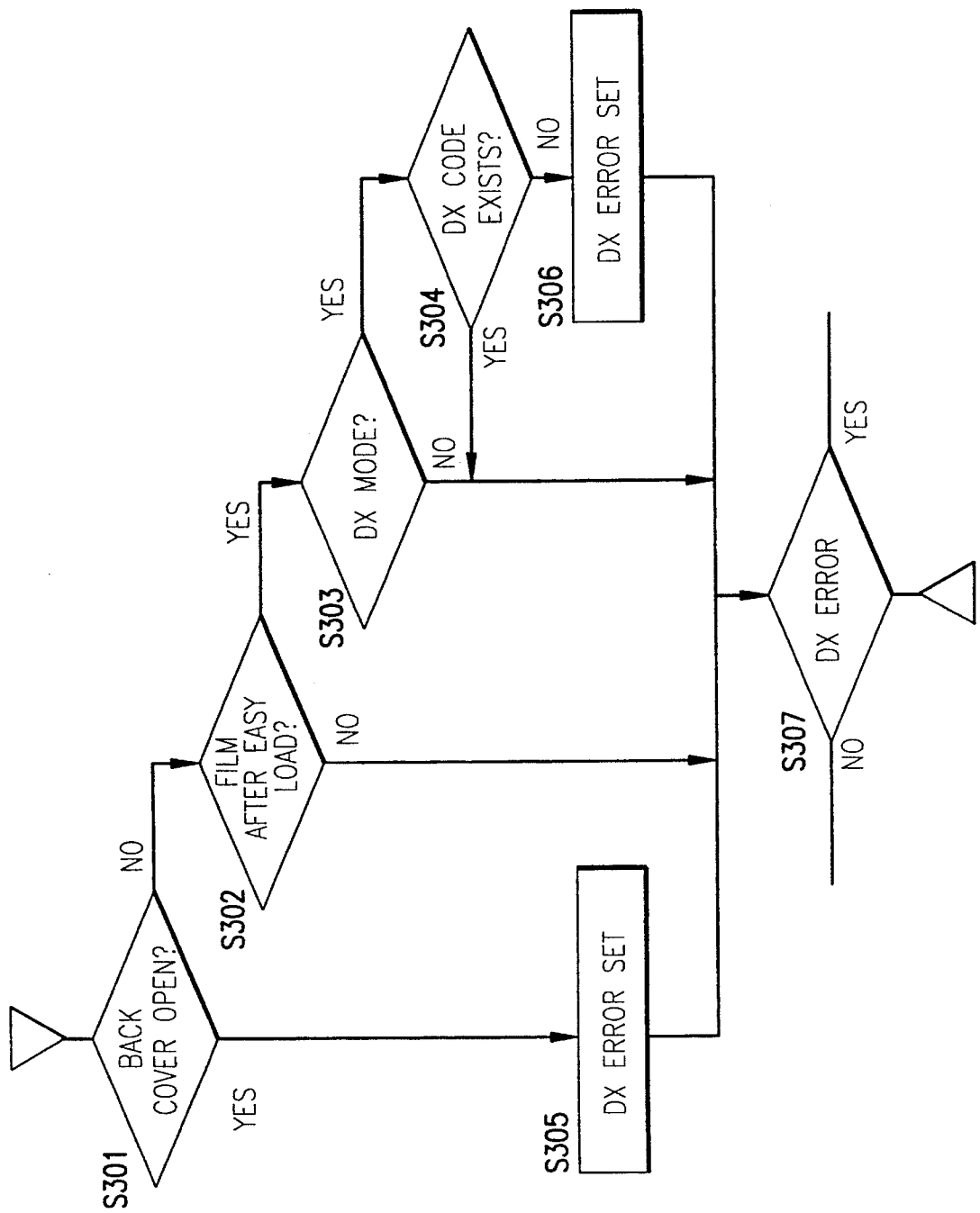
FIG. 11 is a flow chart showing the details of the DX error determination in the setting process sub-routine of FIG. 9.

The determination at S21, for example, is accomplished as shown in FIG. 11. First of all, the open/close state of the back cover is checked (S301). If closed, at S302, after the easy load is accomplished, the existence of the film is checked. Then, if the film is installed, at S303, DX mode is checked. If the film sensitivity is switched over to the manual setting, a warning is not necessary. At S304, the film sensitivity data is read from DX contact point 14. In the case that DX film is not installed, all of the terminals are at high level. In the case that DX film is installed, the data in accordance with the DX code is read. In addition, even if some types of data can be read, if they are data other than the coded data, it is determined that the film is not DX film. Then, the DX error flag is set, and when the back cover is opened it is reset.

Referring back to FIG. 9, at S22, the activation of SW2 (the menu button) is checked. If switch SW2 is set at ON, the process proceeds to S39. If SW2 is OFF or if SW2 is continuously depressed even though SW2 is set at ON, the process will proceed to S23.

At S23, the state register M 0 is checked. If it is 0 and in the non-selection state (implementation display screen), the process goes to S24. If M 0 is 1 or 2 and in the selection state, the process proceeds to S31.

At S24, ON-OFF of SW0 (the mode button) is checked. If control unit 10 is in the advanced mode and SW0 is set at ON, the process proceeds to S25. If control unit 10 is in the simple mode and SW0 is set at OFF, the process ends. In other words, nothing is processed in control unit 10 when the implementation display screen of the simple mode is on.

At S25, the automatic mode is checked. If it is the automatic mode and M 1 is 0, the process proceeds to S26. In other cases, the process proceeds to S27.

At S26, the program shift quantity is set. If M 1=0, as shown in Table 7, by operating SW5, the program shift quantity is reduced ½ step. By operating SW6, the program shift quantity is increased ½ step.

At S27, A (aperture priority) mode or M (manual) mode is checked. When the mode register M 1≧9 in A mode or M mode, the process proceeds to S28. On the other hand, when the mode register M 1≦8 in P (program) mode or S (shutter priority) mode, the process proceeds to S29.

At S28, the AV (aperture) value is changed. In other words, when the mode register M 1 is 9 or 10, as shown in Table 7, the aperture value (AV) setting is down counted by ½ step upon the operation of switch SW5. To increase the aperture value setting by ½ step, switch SW6 is operated.

At S29, the S mode or M mode is checked. If control unit 10 is in the S mode (M 1=8) or in the M mode (M 1=10), the process proceeds to S30. When control unit 10 is in the P mode (M 1≦7) or in the A mode is (M 1=9), the routine ends.

At S30, the TV (shutter speed) value is changed. In other words, when the mode register M 1 is 8 or 10, as shown in Table 7, the shutter speed (TV) setting is decreased by ½ step upon the operation of switch SW3. The shutter speed setting is incremented by ½ step upon the operation of SW4.

At S31, the ON-OFF state of SW2 is checked. If SW2 is ON, the process goes to S32. If SW2 is OFF, the process proceeds to S35.

At S32, timer 104 is checked to determine whether more than 1 second has elapsed. In the case that SW2 has been depressed more than 1 second, the process proceeds to S33. In the case that SW2 has been depressed less than 1 second, the subroutine ends.

At S33, the mode setting details stored in mode register M 3 are transferred to mode register M 1. When no data is stored in the memory, the initial value of 0 is transferred, and control unit 10 is set at the automatic mode (P 0). If a particular mode is stored in mode register M 3, control unit 10 switches to the mode based on the data stored in mode register M 3. The process then proceeds to S34. At S34, mode register M 0 is set at 0, and the subroutine ends.

At S35, the ON-OFF state of SW0 is checked. If control unit 10 is in the advanced mode, SW0 is set ON, and the process proceeds to S37. If control unit 10 is in the simple mode, SW0 is set at OFF, and the process proceeds to S36.

At S36, based on Table 8, the simple mode shown in M 1=0–3 of Table 3B is selected. In other words, when the operation of SW3 is detected, 0 is stored in the mode register M 1, and control unit 10 is set to the automatic mode. In the same manner, when the operation of SW4 is detected, 1 is stored in M 1, and control unit 10 is set to the scenery mode. Similarly, if the operation of SW6 is detected, 3 is stored in M 1, and control unit 10 is set to the close-up mode. If no setting is made, the flag indicating that the setting operation is pending is reset. If no switch is operated, the process proceeds to S38, while the flag indicating that the setting operation is pending is set.

Figure 12:
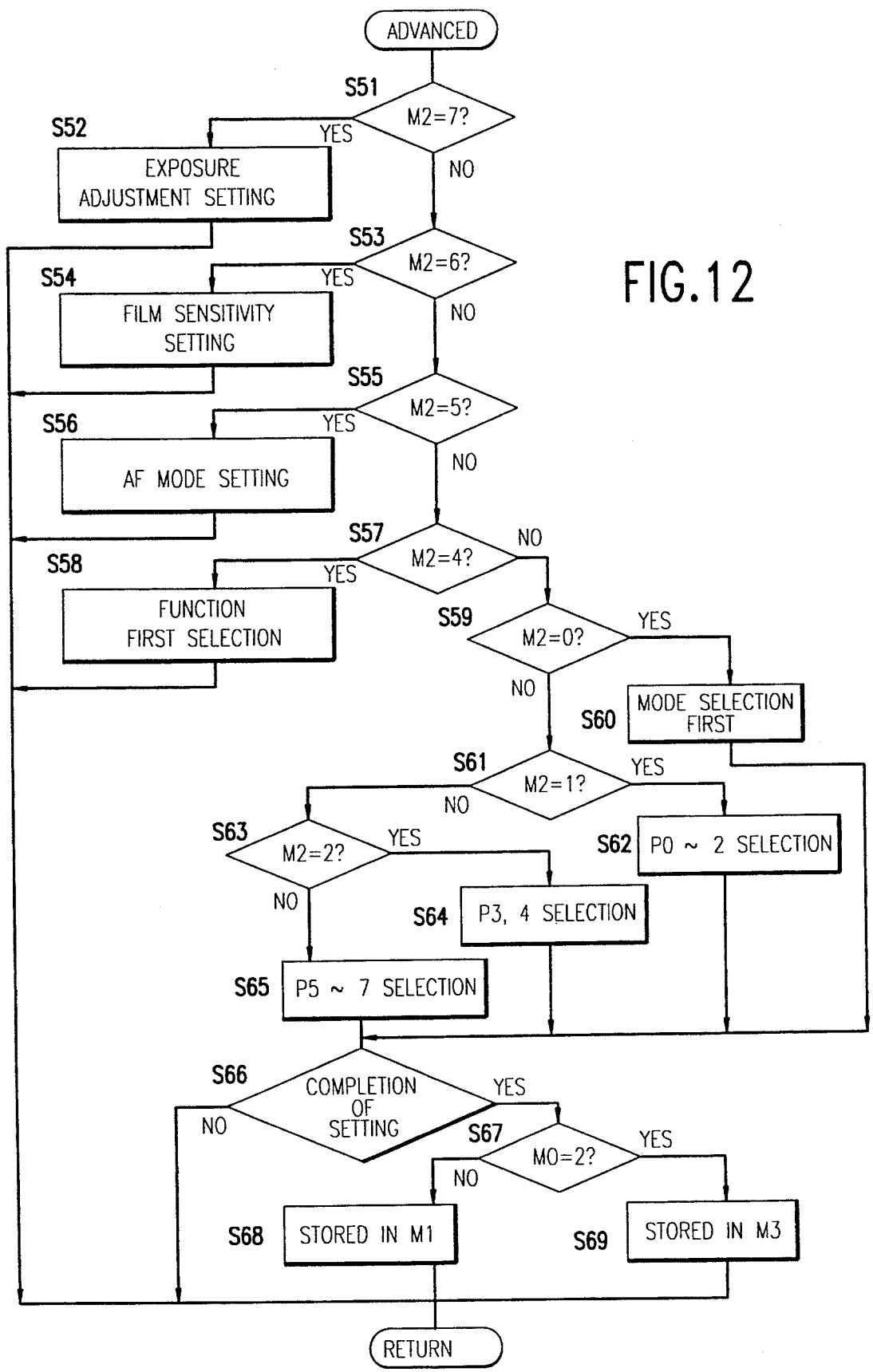
FIG. 12 is a flow chart showing the advanced mode setting routine implemented at the sub-routing advanced mode setting in the setting process of FIG. 9.

At S37, the sub-routine of the advanced mode selection shown in FIG. 12 is executed, and the advanced mode M 2 shown in Table 9 is selected. The advanced modes are set with SW3 through SW6. When a setting is made, the flag indicating that setting operation is pending is reset. If no switch is operated, the process proceeds to S38, while the flag is set.

At S38, completion of the mode setting is checked. If the flat indicating that the setting operation is pending is set (i.e., no mode has been set), the subroutine ends. When the flag needs to be reset (i.e., a mode has been set), the process proceeds to S34.

At S39, after SW2 is operated, the ON-OFF state of SW0 is also checked. If control unit 10 is set to the advanced mode (SW0 is ON), the process proceeds to S40. If control unit 10 is set to the simple mode (SW0 is OFF), the process proceeds to S41. The state register M 0 is set at 1. At the same time, the display screen register M 2 is set at 0, and the process goes to S43.

In the advanced mode, when SW0 is ON, the process goes to S40. At S40, the present state of the state register M 0 is checked. If M 0 is set to 1, the process goes to S42. There, M 0 is set to 2, and at the same, M 1 is set to 4. If M 0 is set to 0 or 2, the process goes to S41. There, M 0 is set to 1 while M 2 is set to 0. Going to S43 from S41 or S42, the flag indicating that the setting operation is pending is set, and the subroutine ends.

In other words, if SW2 is operated (i.e. the menu button is depressed) in the simple mode, the state register M 0 is always set at 1. In the advanced mode, every time the menu button SW2 is depressed, the state register M 0 is changed between 1 and 2. Then, the mode selection state shown in Table 2 is replaced with the function selection state and vice versa. In either case, the flag indicating that the setting operation is pending is set. At this time, if the menu button SW2 is depressed even though control unit 10 is at the implementation display screen, control unit 10 reliably changes to the selection display screen. In addition, if the process goes to S34 from S33 or if the process automatically goes to S34 after the setting is completed, the state register M 0 is switched to 0. Therefore, control unit 10 switches to the implementation display screen.

After the DX error subroutine described above with respect to FIG. 11, at S44, the state register M 0 is set to 2, and the display screen register M 2 is set to 6. Then, at S45, the film sensitivity is set according to the sub-routine shown in FIG. 10 starting at S201. After the film sensitivity is set, the sub-routine ends.

Figure 10:
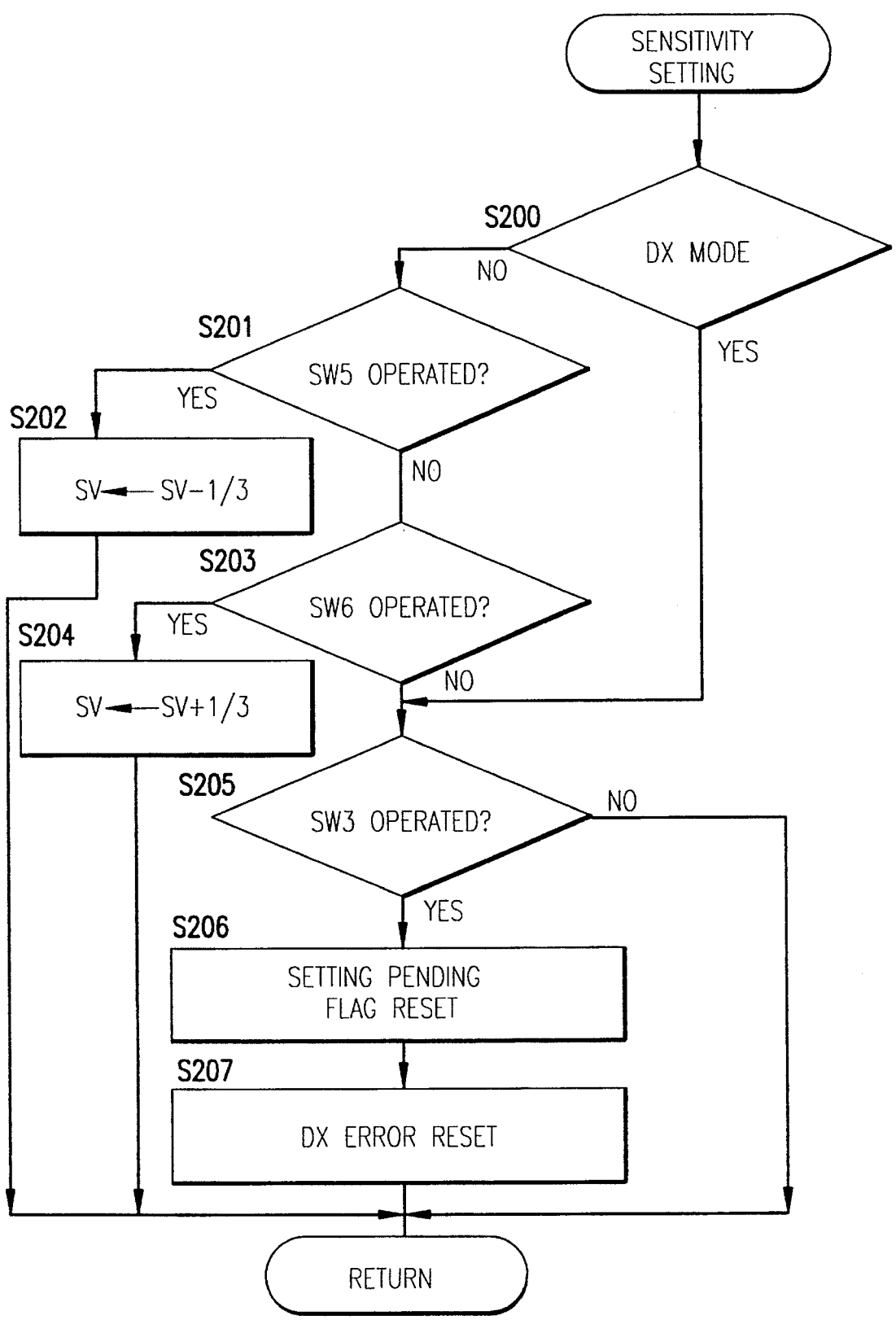
FIG. 10 is a flow chart showing the film sensitivity setting sub-routine implemented at the setting process routine of FIG. 9.

FIG. 10 is a flow chart showing the film sensitivity setting sub-routine. In FIG. 10, M 2=6. At S201, when SW5 is operated, the process proceeds to S202, where the film sensitivity SV is reduced by ⅓ step. The sub-routine then ends. If SW5 is not operated, the operation of SW6 is detected at S203. By operating SW6 at S204, the film sensitivity SV is increased by ⅓ step. At S205, if SW3 is operated, the process proceeds to S206, where it is determined whether the setting is completed. The setting pending flag is set and, at S207, the DX error flag is reset. The process returns from the sub-routine shown in FIG. 10, to the sub-routine shown in FIG. 9 at S45 and then returns to the main routine of FIG. 8.

As described above, in the case of a DX error, the program proceeds to S44 and S45. The mode register M 0 is set to 2, and the display screen register M 2 is set to 6. Switching to the film sensitivity setting display screen, manual film sensitivity setting becomes possible. When the manual film sensitivity setting is completed, the DX error flag is reset. Therefore, the process follows the steps S22→S23→, S31→, S35→S36 (or S37)→S38→S34, and the setting is completed.

FIG. 12 shows the sub-routine of the advanced mode setting routine from S37 shown in FIG. 9. The operations shown in Table 9 are accomplished in accordance with the register mode at that time and the settings of switches SW3 through SW6.

At S51, a determination is made as to whether the display screen register M 2 is set to 7. If M 2 is set to 7 and the display screen is the exposure adjustment setting display screen, the process goes to S52. In all other cases, the process proceeds to S53.

At S52, as shown in the M 2=7 column of Table 9, the exposure adjustment setting is accomplished. When SW5 is operated, the exposure adjustment quantity dSV is reduced by ⅓ step. When SW6 is operated, the exposure adjustment quantity dSV is increased by ⅓ step. When SW3 is operated, control unit 10 determines that the setting is completed, and the setting pending flag is reset. In this mode, there is no response when SW4 is operated. If no switches are operated or if none of the switch operations are valid, the sub-routine ends while the setting pending flag is set.

At S53, a determination is made as to whether M 2 is set to 6 or not. If M 2 is set to 6, which comprises the film sensitivity setting display screen, the process proceeds to S54. In all other cases the process goes to S55.

At S54, as shown in M 2=6 column of Table 9, the film sensitivity setting is accomplished. In other words, in the same manner as in S45 in FIG. 9, the film sensitivity setting sub-routine of FIG. 10 is executed. In this instance, control unit 10 responds to the operation of SW3, SW5 and SW6. However, no response is made to the operation of SW4. When a switch is not operated or the operation is not valid, the sub-routine ends while the setting pending flag is set.

The film sensitivity setting is accomplished by the sub-routine of FIG. 10 starting at S200. At S200, DX mode is checked. If DX film is installed (DX mode: YES), the process proceeds to S205, making it possible to confirm the setting value only with DX film.

At S201, the operation of SW5 is checked. If SW5 is operated, the process proceeds to S202, and the film sensitivity SV is reduced by ⅓ step. At S202, the operation of SW6 is checked. If SW6 is operated, the process proceeds to S204, and the film sensitivity SV is increased by ⅓ step. At S205, the operation of SW3 is checked. If SW3 is operated, the process proceeds to S206. It is then determined whether the setting is completed, and the setting pending flag is reset. At S207, the DX error flag is reset. The operation of SW4 is not checked. In the case that no switch is operated or the operation is not valid, the setting pending flag is reset, or the subroutine ends.

Next, referring to FIG. 12, at S55, a determination is made as to whether M 2 is set to 5. If M 2 is set to 5 and control unit 10 is in the AF mode setting display screen, the process goes to S56. If M 2 is not set to 5, the process goes to S57.

At S56, as shown in M 2=5 row of Table 9, the setting of AF mode is accomplished with SW5 and SW6. When SW5 is operated, AF-S (single mode) is set. When SW6 is operated, AF-C (continuous mode) is set. In either case, when it is determined that the setting is completed, the setting pending flag is reset. The operation of SW3 or SW4 is not responded to by control unit 10. In the case that no switch is operated or the operation is not valid, the subroutine ends while the setting pending flag is reset.

At S57, control unit 10 determines whether M 2 is set to 4. If M 2 is set to 4 and control unit 10 is in the first function display screen, the process proceeds to S58. If M 2 is not 4, the process proceeds to S59.

At S58, as shown in M 2=4 row of Table 9, the first function selection is accomplished. If SW3 is operated and the desired mode is not set, the display screen register M 2 is set to 0 and the display is changed to the first mode selection display screen. On the other hand, if the desired mode is set, the display screen register M 2=4 is maintained, and the contents of register M 3 is set to 0 and cleared. Then, as shown in Table 3B, control unit 10 automatically enters the automatic mode. If SW4 is operated, the display screen register M 2 is set to 5, and the display transfers to AF mode setting display screen. If SW5 is operated, the display screen register M 2 is set to 6, and the display transfers to the film sensitivity setting display screen. If SW6 is operated, the display screen register M 2 is set to 7, and the display transfers to the exposure adjustment quantity setting display screen. If any other switch is operated, control unit 10 determines that the setting is completed, and the setting pending flag is reset. If no switch is operated, the sub-routine ends while the setting pending flag is set.

At S59, a determination is made as to whether M 2 is set to 0. If M 2 is set to 0 and the display is in the first mode selection display screen, the process proceeds to S60. If M 2 is not set to 0, the process proceeds to S61.

At S60, as shown in M 2=0 row of Table 9, the setting of the first mode selection display screen is accomplished. If SW3 is operated, the display screen register M 2 is set to 1, and the display is set to the P 0 through P 2 selection display screen. If SW4 is operated, M 1=8 from Table 3B is set in the saving register X, and the selection of S mode is stored in the memory. If SW5 is operated, M 1=9 from Table 3B is set to the saving register X, and the selection of A mode is stored in the memory. If SW6 is detected, M 1=10 from Table 3B is set to the saving register X, and the selection of M mode is stored in the memory. When any one of the switches SW4 through SW6 is operated, control unit 10 determines that the setting is completed, and the setting pending flag is reset. In the case that no switch is operated, the process proceeds to S66 while the setting pending flag is set. The saving register X functions as a buffer memory to store the data memory temporarily. For example, saving register X can be RAM 103, or it can be structured with a temporal register mounted in CPU 101.

At S61, a determination is made as to whether M 2 is set to 1. When M 2 is set to 1 and the display is in the P 0 through P 2 selection display screen, the process proceeds to S62. When M 2 is not 1, the process proceeds to S63.

At S60, as shown in M 2=1 row of Table 9, the setting of the P 0 through P 2 selection display screen is accomplished. If SW3 is operated, M 1=0 from Table 3B is set to the saving register X, and the selection of the automatic mode (P 0) is stored in the memory. If SW4 is operated, M 1=1 of Table 3B is set to the saving register X, and the selection of the scenery mode (P 1) is stored in the memory. If SW5 is operated, M 1=2 of Table 3B is set to the saving register X, and the selection of the portrait mode (P 2) is stored in the memory. If SW6 is operated, the display screen register M 2 is set to 2, and the display is the P 3 and P 4 selection display screen. If one of switches SW4 through SW5 is operated, control unit 10 determines that the setting is completed, and the setting pending flag is reset. If SW6 is operated, and no switching is accomplished, the process proceeds to S66 while the setting pending flag is set.

At S63, a determination is made as to whether M 2 is set to 2. In the case that M 2 is set to 2 and the display in the P 3 and P 4 selection display screen, the process goes to S64. If M 2 is not set to 2, that is, in the case that M 2 is set to 3, the process goes to S65.

At S64, as shown in M 2=2 row of Table 9, the setting of the P 3 and P 4 selection display screen is accomplished. If SW3 is operated, the display screen register M 2 is set to 1, and the display goes to the P 0 through P 2 selection display screen. If SW4 is operated, M 1=3 of Table 3B is set to the saving register X, and the selection of the close-up mode (P 3) is stored in the memory. If SW5 is operated, M 1=4 of Table 3B is set to the saving register X, and the selection of the sports mode (P 4) is stored in the memory. If SW6 is operated, the display screen register M 2 is set to 3, and the display goes to P 5 through P 7 selection display screen. If SW4 or SW5 is operated, control unit 10 determines that the setting is completed, and the setting pending flag is reset. If SW3 or SW6 is operated, and no switching is accomplished, process goes to S66 while the setting pending flag is set.

At S65, as shown in M 2=3 row of Table 9, the setting of the P 5 through P 7 selection display screen is accomplished. If SW3 is operated, the display screen register M 2 is set to 2, and the display goes to the P 3 and P 4 selection display screen. If SW4 is operated, M 1=5 of Table 3A is set to the saving register X, and the selection of the night view mode (P 5) is stored in the memory. If SW5 is operated, M 1=6 of Table 3B is set to the saving register X, and the selection of the silhouette mode (P 6) is stored in the memory. If SW6 is operated, M1=7 of Table 3B is set to the saving register X, and the selection of the inspiration mode (P 7) is stored in the memory. If any one of switches SW4 and SW6 is operated, control unit 10 determines that the setting is completed, and the setting pending flag is reset. If SW3 is operated, and in the case that no switching is accomplished, the process goes to S66 while the setting pending flag is set.

At S66, a determination is made as to whether the setting is completed or not. In the case that the setting pending flag is set to 1 and the setting has not been completed, the sub-routine ends. In the case that the setting pending flag is set to 0, and the setting has been completed, the process goes to S67.

At S67, a determination is made as to whether M 0 is 2. If M 0 is 2 and control unit 10 is in the function selection state, the process goes to S69. If M 0 is 1 and control unit 10 is in the mode selection state, the process goes to S68.

At S68, the numerical value corresponding to the selected mode stored in the saving register X is transferred to the state register M 1. At S69, the numerical value corresponding to the selected mode stored in the saving register X is transferred to the mode register M 3 for storage. Also, the desired mode is stored in the memory. At this time, the contents of the state register M 1 remain. Therefore, when the display returns to the implementation display screen, the modes have not been changed. In order to make the stored mode setting valid, control unit 10 automatically sets the mode. At S33 of FIG. 9, the contents of the mode register M 1 are stored in the mode register M 3.

Figure 13:
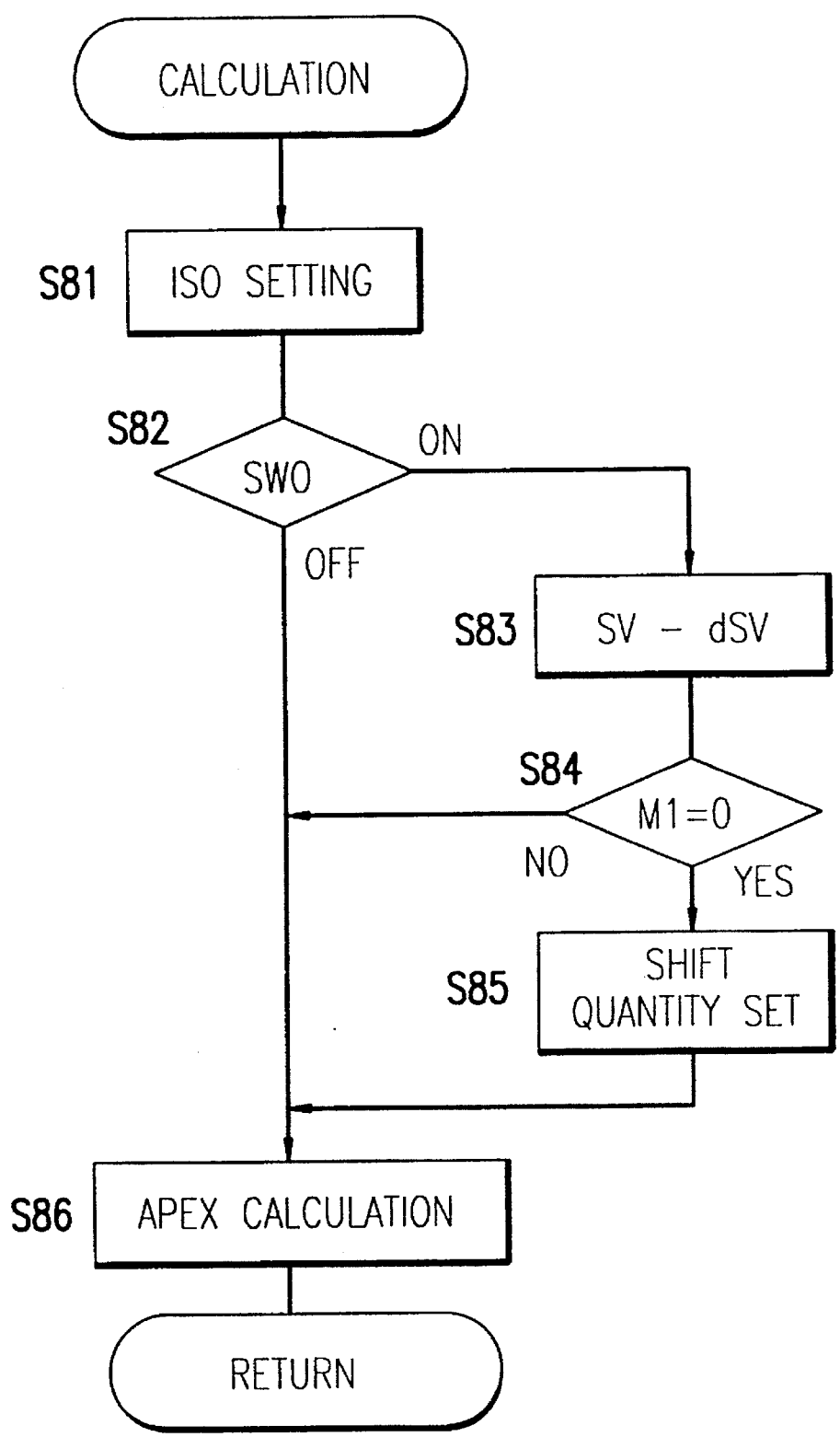
FIG. 13 is a flow chart showing the sub-routine for the APEX calculation implemented in the calculation step of the main routine of FIG. 8.

FIG. 13 shows the process sub-routine for the APEX calculation accomplished at S3 of FIG. 8. In FIG. 13, at S81, the setting of the film sensitivity for APEX calculation is accomplished. For DX film, the numerical value corresponding to the state read from DX contact point 14 is set as the film sensitivity. If the film is not DX film, the film sensitivity, set using the sub-routine of FIG. 10, is set manually. At S82, the ON-OFF state of SW0 is checked. In the case that if SW0 is ON in the advanced mode, the process proceeds to S83. If SW0 is OFF in the simple mode, the process proceeds to S86. At S83, the exposure adjustment quantity dSV obtained at S52 of FIG. 12 is subtracted from the film sensitivity SV obtained at S81. This value is set as the actual effective film sensitivity. At S84, a determination is made as to whether the mode register M 1 is set to 0. If M 1=0 in the automatic mode, the process proceeds to S85. If M 1 is not 0, the process proceeds to S86. At S85, the program shift quantity is set. In other words, the combination of the preset aperture and the shutter speed can be changed with this operation.

At S86, the APEX calculation is accomplished in accordance with the values obtained above. In other words, in the simple mode, the APEX value follows the DX setting and is not affected by the manual film sensitivity setting or the exposure adjustment results. On the other hand, in the advanced mode, the manual film sensitivity setting or the exposure adjustment setting influences the APEX calculation. In addition, the program shift occurs only during the program mode in the advanced mode.

Figure 14:
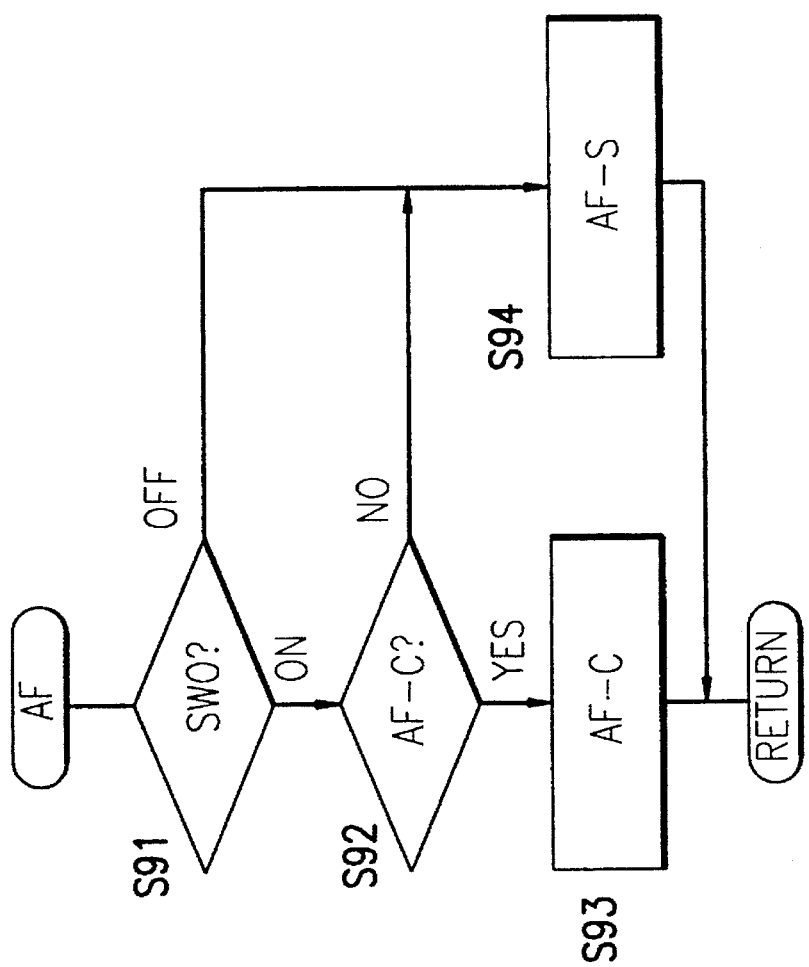
FIG. 14 is a flow chart showing the AF control sub-routine implemented at the control step of the main routine of FIG. 8.

FIG. 14 is a flow chart showing the AF control subroutine from S4 of FIG. 8. At S91, the ON-OFF state of SW0 is checked. If SW0 is ON in the advanced mode, the process proceeds to S92. If SW0 is OFF in the simple mode, the process proceeds to S94. At S92, the AF - C (auto-focus continuous) mode is checked. In the case that control unit 10 is in the AF - C mode at S56 of FIG. 12, the process proceeds to S93. In the case that control unit 10 is in the AF - S (auto-focus single) mode, the process proceeds to S94.

At S93, the control of the AF - C mode is accomplished. In other words, the focusing operation is continued as long as the half-depressed SW7 is ON. At S94, the control of AF - S mode is accomplished. In other words, the focusing operation is continued as long as the half-depressed SW7 is ON. However, when the lens is focused once, the focusing operation is not continued until SW7 is re-activated by half depressing the switch.

In the manner described, in the simple mode, the AF - S control is always accomplished. In the advanced mode, the AF control is accomplished in accordance with the AF mode set by the function setting.

Figure 15:
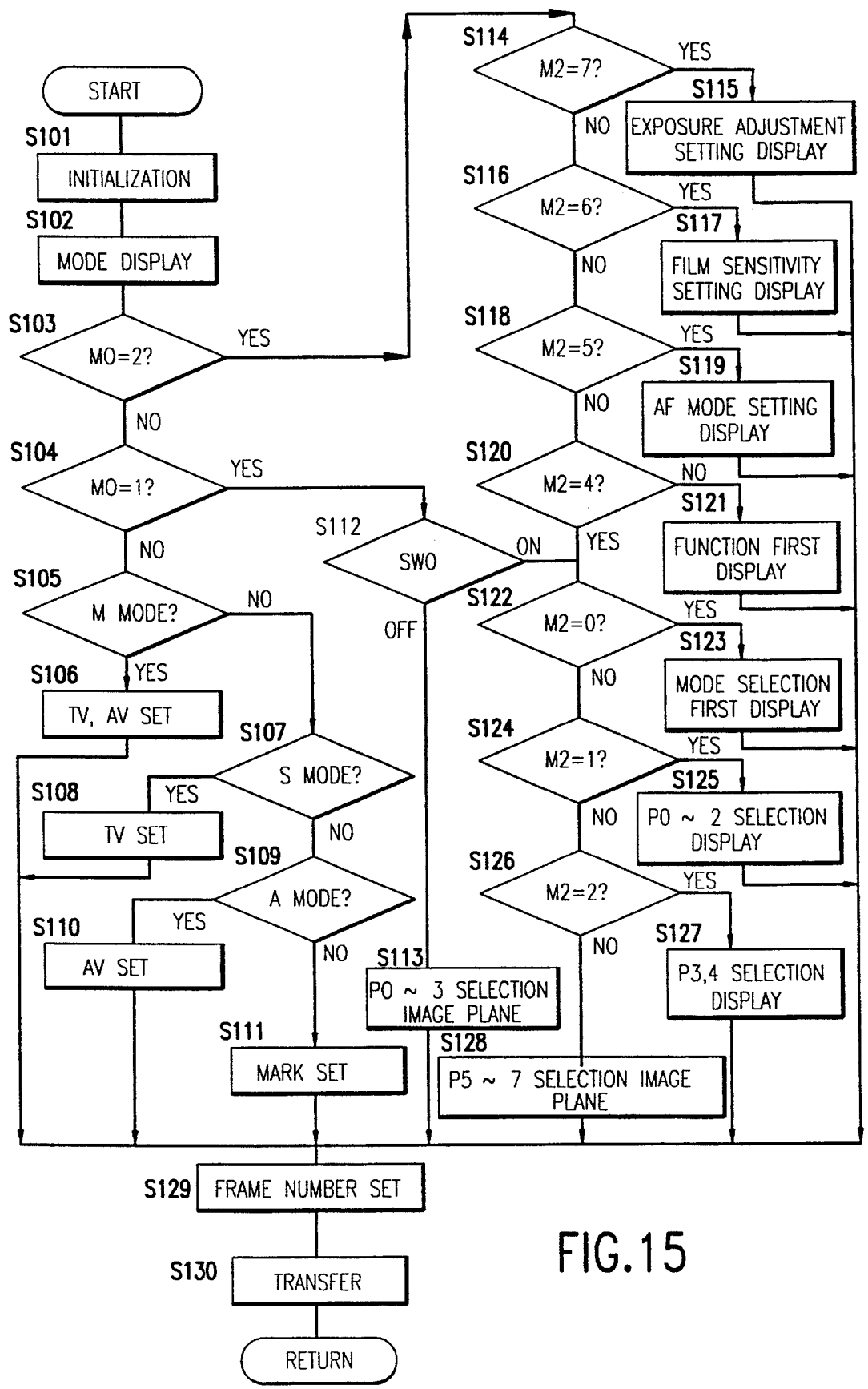
FIG. 15 is a flow chart showing the display sub-routine implemented at the control step of the main routine of FIG. 8.

FIG. 15 is a flow chart of the display routine of MCU 10 at control step S4 shown in FIG. 8. At S101, the data area D 0 through D 11 transferred to LCD driver 20 are initialized. At this time, address 20 as the blank display in FIG. 7 is set to D 0 through D 7. 0 is set for D 8 through D 11 in order to display the lights out in the same manner.

At S102, the data that control the segment display sections 35 through 37 are set in order to accomplish various types of mode displays. In other words, to accomplish the exposure control mode display, the data are set to D 11 from Table 4 in accordance with M 1 for the implementation display screen of the advanced mode and the mode selection display screen. In the cases that the exposure adjustment is set and the adjustment quantity (dSV) is other than 0, the bit 6 of D 10 is set to 1 in order to flash the segment display section 35. In addition, in the case that the setting of desired mode is accomplished, the bit 7 of D 10 is set to 1, in order to flash the segment display section 36. These areas are kept at 0 and are not flashed in the simple mode.

At S103, a determination is made as to whether M 0 is set to 2. In the case that M 0 is set to 2 at the function display screen, the process proceeds to S114. Otherwise, the process proceeds to S104. At S104, a determination is made as to whether M 0 is set to 1. If M 0 is set to 1 in the mode selection state, the process proceeds to S112. Otherwise, the process proceeds to S105. At S105, a determination is made as to whether the mode register M 1 is set to 10. In the case that M 1 is set to 10 in the M mode, the process proceeds to S106. Otherwise, the process proceeds to S107.

At S106, the display setting of the implementation display screen in M mode is accomplished. In other words, the set TV value and the set AV value are set to the data area of D 0 through D 7. For example, in the case that F 5.6 of 2000 is set, addresses "42", "0A", "4A", "0A", "26", "05", "16", and "20" are set to D 0 through D 7, in accordance with the FIG. 7. In addition, in the case of M mode, the setting of TV value and AV value is possible. Therefore, the binary numerals of "110110" are set to the bits 5 through 0 of D 10, and the lighting of the segment display section 34f, e, c and b is possible.

In addition, in the case that "2000" is displayed, "0A" and "4A" are used. The reason is that, as shown in FIG. 4a, if a space is placed in the combined em display and half-em display, the display is balanced aesthetically. The shapes of "4A" and "0A" are identical, but the position is shifted to the left by 1 dot. As a result, it is possible to adjust the spacing in the display.

At S107, a determination is made as to whether the mode register M 1 is set to 8. If it is set to 8 in S mode, control circuit 10 goes to S108. Otherwise, it goes to S109. At S108, the display setting of the implementation display screen in S mode is accomplished. In other words, the TV value is set to the data area D 0 through D 3. For example, in the case that 2000 is set, in accordance with FIG. 7, addresses "42", "0A", "4A", and "0A" are set to D 0 through D 3. In addition, the S mode is capable of setting the TV value. Therefore, "000110" of binary numerals are set to the bits 5 through 0 of D 10, and the segment display of 34b and 34c is lighted.

At S109, a determination is made as to whether the mode register M 1 is set to 9. If it is set to 9 in A mode, the process proceeds to S110. Otherwise, (that is, control unit 10 is in the P mode), it should go to S111. At S110, the set AV value is set to the data area D 4 through D 7. For example, in the case that F 5.6 is set, in accordance with FIG. 7, addresses "26", "05", "16", and "20" are set to D 4 through D 7. In addition, in the A mode, the setting of the AV value can be accomplished. Therefore, "110000" of binary numerals are set to the bits 5 through 0 of D 10, and the lighting of the segment display of 34f and 34e is possible.

At S111, in order to make the mark display correspond to the stored mode in M 1, the data according to Table 10 is set to the data area D 0 and D 1. In addition, P mode is not capable of setting the TV value or AV value normally. Therefore, "000000" of binary numerals are set to the bits 5 through 0 of D 10, and all of the segment display 34 is unlit. However, to make the program shift possible, only in the advanced mode, "1100000" are set, and the segment display section 34e and 34f are lit.

TABLE 10

| M 1 | Mode register | D 0 | D 1 |
|---|---|---|---|
| 0 | P 0: Automatic mode | 80 | 81 |
| 1 | P 1: Scenery mode | 82 | 83 |
| 2 | P 2: Portrait mode | 84 | 85 |
| 3 | P 3: Close up mode | 86 | 87 |
| 4 | P 4: Sports mode | 88 | 89 |
| 5 | P 5: Night view | 8C | 8D |
| 6 | P 6: Silhouette mode | 8E | 8F |
| 7 | P 7: Inspiration mode | 8A | 8B |

At S112, the ON-OFF state of SW0 is checked. If ON in the advanced mode, the process proceeds to S122. If OFF in the simple mode, the process proceeds to S113. In the case that the camera displays the simple mode selection display screen, control unit 10 goes to S113. At S113, in order for the LCD display unit of 31a through 31h to accomplish the mark display corresponding to the automatic mode, scenery mode, portrait mode, and close up mode, in accordance with Table 10, 80 through 87 are transferred to the data area of D 0 through D 7. In addition, to indicate the desire to select one of the four modes above, the segment display of 34a, 34c, 34d, and 34f flash. For that reason, "101101" of the binary numerals are set to the bits 5 through 0 of D 10. At the same time, the flashing flag for each is set, and the flashing display is accomplished at S130, explained below.

Table 11 shows the numerical values to be set to D 0 through D 7 to determine the display state in the dot matrix display section 310 determined by the display screen register M 2 in the mode selection state of the advanced mode or the function selection state. The operation occurs in steps S114 through S128.

TABLE 11

| M 2 | Display screen | D 0 | D 1 | D 2 | D 3 | D 4 | D 5 | D 6 | D 7 |
|---|---|---|---|---|---|---|---|---|---|
| 0 | First mode selection | 90 | 91 | 92 | 93 | 94 | 95 | 96 | 97 |
| 1 | P 0–P 2 selection | 80 | 81 | 82 | 83 | 84 | 85 | A2 | A3 |
| 2 | P 3 & P 4 selection | A0 | A1 | 86 | 87 | 88 | 89 | A2 | A3 |
| 3 | P 5–P 7 selection | A0 | A1 | 8E | 8F | 8C | 8D | 8A | 8B |
| 4 | Function first | 98 | 99 | | | | | | |
| | | 9A | 98 | CE | CF | 9C | 9D | 9E | 9F |
| 5 | AF mode setting | CE | CF | 20 | 20 | AC | AD | AE | AF |
| 6 | Film sensitivity | | | A4 | A5 | Set according to AV | | | |
| | | 9C | 9D | A6 | A7 | | | | |
| 7 | Exposure adjustment setting | 9E | 9F | 20 | 20 | Set according to dSV | | | |

At S114, a determination is made as to whether M 2 is 7. If M 2 is 7, and the display is in the exposure adjustment setting display screen, control unit 10 goes to S115. Otherwise, it goes to S116.

At S115, as shown in M 2=7 row of Table 11, the display data of the exposure adjustment setting display screen is set. In other words, addresses "9E" and "9F" are set to D 0 and D 1. Concerning D 2 and D 3, if no process is accomplished, the setting of "20" will remain, which was set at S101, and the display is the blank display. Concerning D 4 through D 7, the display data for the adjustment quantity is set in accordance with the set adjustment quantity dSV. In the case that the adjustment quantity is ±0, the display of "±0.0" is possible by setting addresses "66", "0A", "60" and "0A" to D 4 through D 7 in accordance with FIG. 7. Also, 34e flashes to indicate dSV decrementing, 34f flashes to indicate dSV incrementing, and 34a flashes to indicate the completion of the setting. For that, "110001" of binary numerals are set to the bits 5 through 0 of D 10. At the same time, the flashing flag of 34e is set, and the flashing display is accomplished, as described below in S130.

At S116, a determination is made as to whether M 2 is 6. If M 2 is 6 and in the film sensitivity setting display screen, control unit 10 goes to S117. Otherwise, it goes to S118.

At S117, as shown in M 2=6 row of Table 11, the display data for the film sensitivity setting display screen is set. In other words, addresses "9C" and "9D" are set to D 0 and D 1. Concerning D 2 and D 3, addresses "A4" and "A5" are set for DX film, making "DX" display possible. Addresses "A6" and "A7" are set for non-DX film, to display the manual setting feature, "MSET". Concerning D 4 through D 7, in accordance with the film sensitivity SV set to DX setting or to manual setting, the display data of the film sensitivity is set. If the film sensitivity is 400, then addresses "20", "04", "0A" and "0A" are set to D 4 through D 7, in accordance with FIG. 7.

And, in the case that the film is not DX film, 34e flashes to indicate the SV decrementing, 34f flashes to indicate SV incrementing, and 34a flashes to indicate the completion of the setting. To accomplish the display, "110001" of binary numerals are set to the bits 5 through 0 of D 10. At the same time, the flashing flag of 34a is set, and the flashing display is accomplished at S130, described later.

In the case of DX film, flashing is used only for confirmation. Therefore, 34a flashes to indicate the completion of the setting. To accomplish this, "000001" of binary numerals are set to the bits 5 through 0 of D 10. At the same time, the flashing flag of 34a is set.

At S118, a determination is made as to whether M 2 is 5. If M 2 is set to 5 and in the AF mode setting display screen, control unit 10 goes to S119. Otherwise, it goes to S120.

At S119, as shown in M 2=5 row of Table 11, the display data of AF mode setting display screen is set. In other words, CE and CF are set to D 0 and D 1, making "AF" display possible. Concerning D 2 and D 3, if no setting is made, 20 remains from the setting at S101, and the display is the blank display. Concerning D 4 through D 7, a total em display of "S" and "C" is possible by setting addresses "AC", "AD", "AE", and "AF".

To prompt the setting of "S" or "C", 34d and 34f flash. In order to do so, "101000" of binary numerals are set to the bits 5 through 0 of D 10. At the same time, each flashing flag is also set, and a flashing display is accomplished at S130.

At S120, a determination is made as to whether M 2 is 4. If M 2 is set to 4 and in the first function display screen, the process goes to S121. Otherwise, the process goes to S122. At S121, as shown in M 2=4 row of Table 11, the display data of the first function display screen is set. In other words, if the desired mode is not set to D 0 and D 1, 98 and 99 are set, causing the display to prompt the setting. On the other hand, if the desired mode is set, 9A and 9B are set, causing the display to prompt the clear operation. Concerning D 2 through D 7, the display of "AF," "ISO," and "+/–" occur by setting CE, CF, 9C, 9D, 9E, and 9F. In addition, to indicate that one of the four functions above should be selected, segment display 34a, 34c, 34d, and 34f flash. In order to do so, "101101" of binary numerals are set to the bits 5 through 0 of D 10. At the same time, each flashing flag is set, and the flashing display is accomplished at S130. At S122, a determination is made as to whether M 2 is 0. If M 2 is set to 0 in the first mode selection display screen, the process goes to S123. Otherwise, the process goes to S124. At S123, as shown in M 2=0 row of Table 9, the display data of the first mode selection display screen is set. In other words, by setting the numerical values shown in the same row, the display shows "P", "S", "A" and "M". In addition, to indicate that one of the four functions above should be selected, the segment display of 34a, 34c, 34d, and 34f flash. In order to do so, "101101" of binary numerals are set to the bits 5 through 0 of D 10. At the same time, each flashing flag is set, and the flashing display is accomplished at S130.

At S124, a determination is made as to whether M 2 is 1. If M 2 is 1 in the P 0 through P 2 selection display screen, control unit 10 goes to S125. Otherwise, it goes to S126. At S125, as shown in M 2=1 row of Table 9, the display data of P 0 through P 2 selection display screen are set. In other words, by setting the numerical values shown in the same row, the display corresponding to P 0 through P 2 and the right arrow mark display can be made. Regarding the right arrow mark, the display screen changes to display the selection of other modes by depressing the corresponding button. In addition, to indicate that one of the four functions above should be selected, segment display 34a, 34c, 34d, and 34f flashes. In order to do so, "101101" of binary numerals are set to the bits 5 through 0 of D 10. At the same time, each flashing flag is set, and the flashing display is accomplished at S130, which will be explained later.

At S126, a determination is made as to whether M 2 is 2. In the case that M 2 is 2 in the P 3 and P 4 selection display screen, the process goes to S127. Otherwise, that is, in the case of M 2=3, it should go to S128. At S127, as shown in M 2=2 row of Table 11, the display data of P 3 and P 4 selection display screen are set. In other words, by setting the numerical values shown in the same rows, P 3 and P 4 and the right and left arrow mark are displayed. Depressing the button corresponding to the right and left arrow mark, the display screen is changed, displaying the selection of other modes. In addition, to indicate that one of the four functions above should be selected, 34a, 34c, 34d, and 34f flashes. In order to do so, "101101" of binary numerals are set to the bits 5 through 0 of D 10. At the same time, each flashing flag is set, and the flashing display is accomplished at S130, which will be explained later.

At S128, as shown in M 2=3 row of Table 11, the display data of P 5 through P 7 selection display screen are set. In other words, by setting the numerical values shown in the same row, the display corresponding to P 5 through P 7 and the right and left arrow mark display is made. Depressing the button corresponding to the left arrow mark, the display screen is changed, displaying the selection of other modes. In addition, to indicate that one of the four functions above should be selected, segment display 34a, 34c, 34d, and 34f flashes. In order to do so, "101101" of binary numerals are set to the bits through 0 of D 10. At the same time, each flashing flag is set, and the flashing display is accomplished at S130, which will be explained later.

At S129, the frame number data is set to D 8 and D 9. To display "24", "1100110" in binary numerals is set to D 8 for the segment display 32g, 32f, 32c and 32b to flash, and "1011011" in binary numerals is set to D 9 for the segment display 33g, 33e, 33d, 33b, and 33a to flash.

At S130, D 0 through D 11 data set at S101 through S129 are transferred to LCD driver 20, and the operation of display panel 30 is possible. In addition, when segment display section 34a through 34f are set to flash, a 1 second cycle of flash display is possible by setting the bits 5 through 0 of D 10 to 0 for every 0.5 second.

In the manner above described, in the case that DX film is mounted in the camera, a DX film reading is possible in the DX mode. In the advanced mode, a change in the setting value cannot be made. However, data confirmation is possible at the film sensitivity setting display screen of the function selection state. However, the confirmation of the numerical value cannot be accomplished in the simple mode.

On the other hand, in the case that the back cover is closed and non-DX film is mounted, the DX mode is released, and the display changes to the film sensitivity setting display screen. It is then possible to set the film sensitivity by manual operation. And, when the setting is completed, the warning state is released. Even when the power source is cut off, the DX warning state remains. Therefore, the film sensitivity setting display screen remains until the setting is completed. In addition, as shown in FIG. 11, if the back cover is opened, the warning is not needed due to the film exchange. Therefore, the DX error flag is reset. At this time, the film setting display screen is replaced with the normal display screen.

Figure 16:
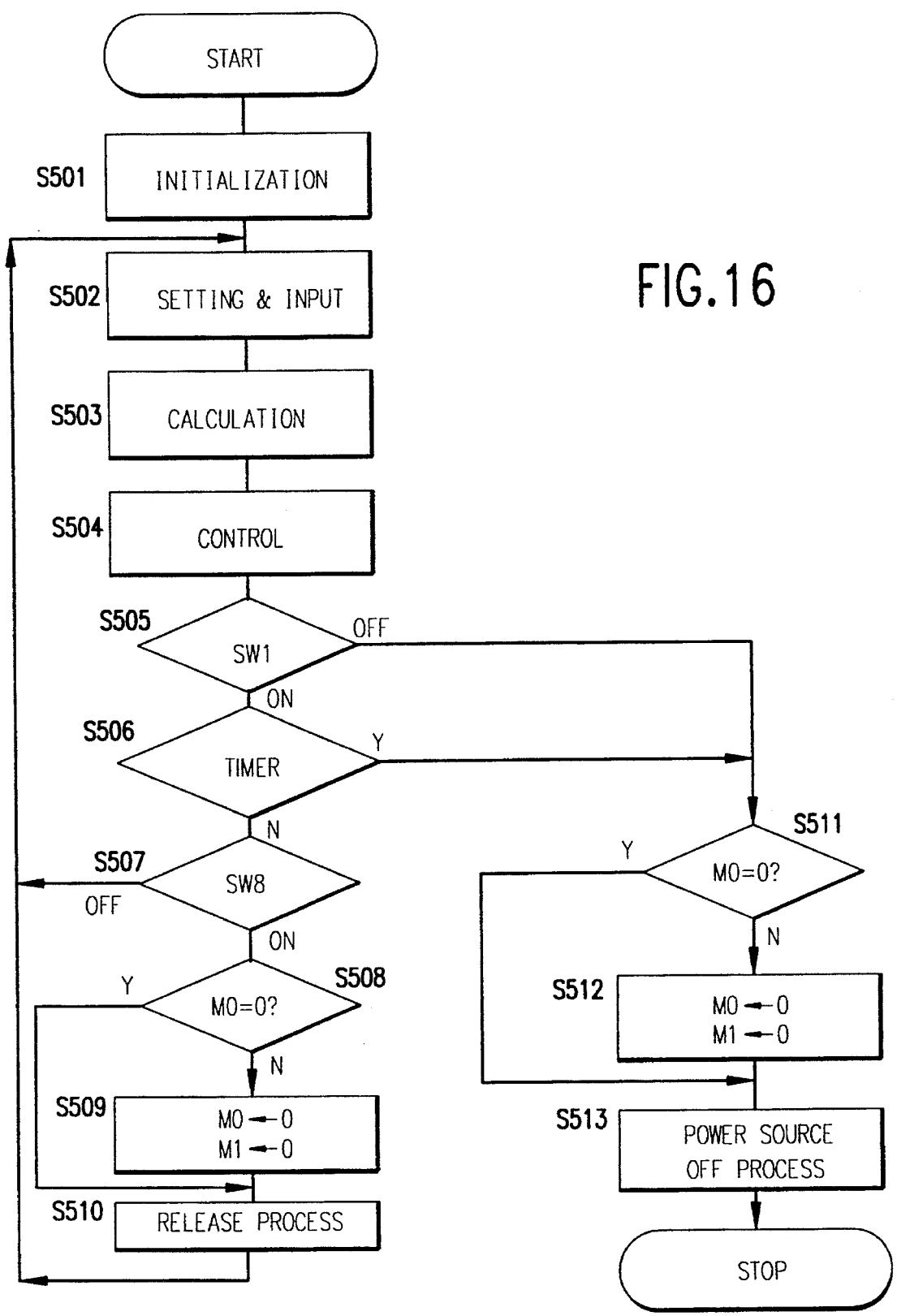
FIG. 16 is a flow chart showing the main routine of the control device in another feature of this invention.

FIG. 16 is a flow chart of another main routine executed by the control device (MCU) 10. When either switch SW2 or switch SW7 is turned ON, an interrupt signal is input to MCU 10 while it is on stand-by (a condition in which only a minuscule amount of electric current is flowing), and the process in S501 is started. In S501, the MCU 10 is initialized, the power source circuit 11 is turned on, and power is supplied to all circuits. In addition, the clock circuit 104 in the MCU 10 is started, and the main clock is turned on.

In S502, a setting operation is conducted by determining the switch from which the signal was input into MCU 10. In addition, the outputs of photometry circuit 12 and distance measurement circuit 13 are input into MCU 10 and are stored in RAM 103 of MCU 10. With the present embodiment, a power source check is conducted at this step. If the results of the power source check indicate that the voltage is below a prescribed voltage, a warning is issued. This warning can, for example, be an error display on display panel 30 of the patterns in, e.g., the address "DC" and the address "DD" (i.e., "Err") of the characters shown in FIG. 7, and can include specifying the patterns for the addresses "D6" and "D7". In addition, depending upon the circumstances, shutter release can be prevented.

In S503, exposure and distance measurement calculations are made in accordance with the condition of the data in RAM 103 obtained in S502. With the present embodiment, when the output of photomerry circuit 12 indicates low brightness in this step, a warning encouraging the use of, e.g., a strobe, can be issued (not shown).

In S504, AF control (which controls first motor control 17) and display control (which drives LCD driver 20) are executed. In S505, a determination is made as to whether main switch SW1 is in the ON position. If main switch SW1 is on, MCU 10 advances to S506. If the switch is off, MCU 10 advances to S511.

In S506, a determination is made as to whether the power source support timer exceeds a preset value. (The timer was cleared when the detection of the ON condition of the switches SW2 to SW7 was conducted in the setting input process in S502.) If a switch is not operated, the power source support timer increases in value. When the timer exceeds the preset value, MCU 10 advances to S511. On the other hand, when one of switches SW2 to SW7 is operated and turned on, the timer is cleared. Therefore, because the timer does not exceed the preset value, MCU 10 advances to S507.

In S507, a determination is made as to whether shutter release switch SW8 is ON. If shutter release switch SW8 is OFF, MCU 10 returns to S502. If switch SW8 is ON, MCU 10 advances to S508.

In S508, MCU 10 determines whether the state register M 0 is "0". If register M 0 is 0, MCU 10 advances to S510 because one of the modes has been selected. If register M 0 is 1, however, the 10 advances to S509 because the camera is in a state in which none of the modes have been selected.

In S509, the state register M 0 is set to 0, indicating the non-selection state, and mode register M 1 is set to 0 so as to set the automatic mode. In S510, a well-known release sequence is conducted by controlling second motor control circuit 18 and controlling exposure control circuit 19. After the release sequence has been completed, MCU 10 returns to S502 and repeats the processes described above. Accordingly, even when the release sequence is entered with the selection state such that no mode has been selected, the camera is always controlled by the automatic mode.

On the other hand, when main switch SW1 is OFF and the power source support timer exceeds a fixed value, MCU 10 moves to S511. In S511, a determination is made as to whether state register M 0 is 0. If the register is 0, MCU 10 advances to S513, but if the register is 1, MCU 10 advances to S512.

In S512, the state register M 0 is set to 0, indicating the non-selection state, and the mode register M 1 is set to 0 so as to set the automatic mode. In S513, power source circuit 11 is turned off, MCU 10 enters the standby mode, and this series of processes is concluded.

When main switch SW1 is turned OFF or the timer exceeds a fixed time in the setting state, the state and mode are changed prior to the process of turning the power source OFF. As a result, the automatic mode is already set when the power source is next turned on.

Figure 17:
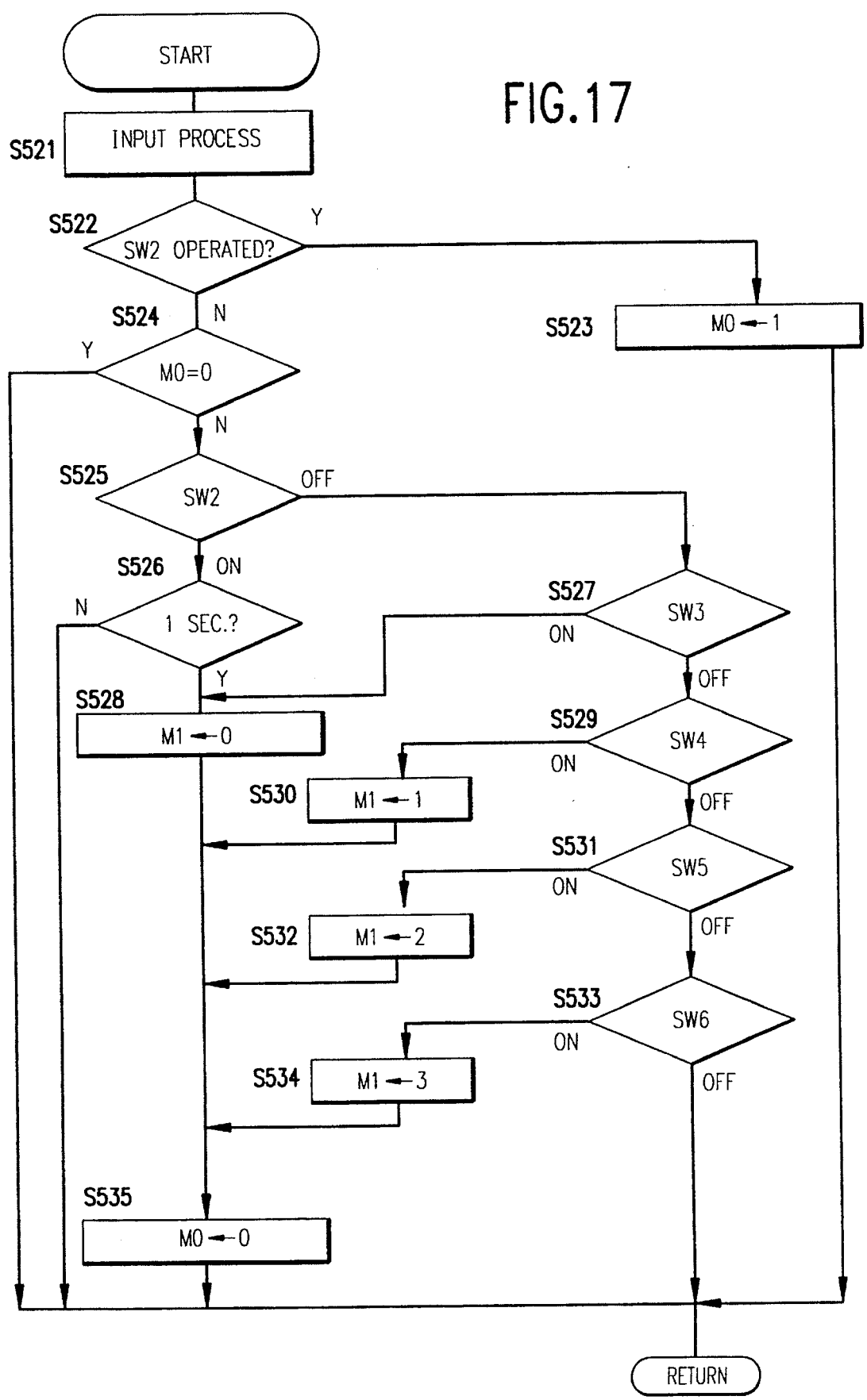
FIG. 17 is a flow chart showing the setting process sub-routine implemented at the setting step of the main routine of FIG. 16.

FIG. 17 shows part of the setting process routine, and is executed as a sub-routine during the process in S502 of FIG. 16. In S521, the input from switches SW2 to SW7 is received. If one of the switches is ON, the power source support timer that makes a determination in S506 of FIG. 16 is cleared.

In S522, a determination is made as to whether a decay in the signal from switch SW2 is occurring. If the signal decays immediately after switch SW2 is turned ON, MCU 10 advances to S523. If switch SW2 is OFF, or if switch SW2 is ON but is still being pressed, MCU 10 advances to S524. In S523, the state register M 0 is set to 1, and MCU 10 returns with this value as the selection state.

In S524, a determination is made as to whether the state register M 0 is 0. When the state register is 0, MCU 10 returns, but if a selection state exists and M 0=1, MCU 10 advances to S525.

In S525, a determination is made as to whether the switch SW2 is on or off. If the switch SW2 is on, the MCU 10 advances to S526; if the switch SW2 is off, the MCU 10 advances to S527.

In S526, a determination is made as to whether at least one second has elapsed. If switch SW2 has been depressed for at least one second, MCU 10 advances to S528. If not, MCU 10 returns.

In S527, a determination is made as to whether switch SW3 is ON or OFF. If switch SW3 is ON, MCU 10 advances to S528. If switch SW3 is OFF, MCU 10 advances to S529. In S528, mode register M 1 is set to the automatic mode as 0, and MCU 10 then advances to S535.

In S529, a determination is made as to whether switch SW4 is ON or OFF. If switch SW4 is ON, MCU 10 advances to S530. If switch SW4 is OFF, MCU 10 advances to S531. In S530, the mode register M 1 is set to the scenery mode as 1, and MCU 10 then advances to S535.

In S531, a determination is made as to whether switch SW5 is ON or OFF. If switch SW5 is ON, MCU 10 advances to S532. If switch SW5 is OFF, MCU 10 advances to S533. In S532, the mode register M 1 is set to the portrait mode as 2, and MCU 10 then advances to S535.

In S533, a determination is made as to whether switch SW6 is ON or OFF. If switch SW6 is ON, MCU 10 advances to S534. If switch SW6 is OFF, MCU 10 returns. In S534, mode register M 1 is set to the close-up mode as 3, and MCU then advances to S535. In S535, the state register M 0 is set to 0, and MCU 10 then returns.

Accordingly, switches SW3 to SW6 are effective only in the selection state. Switch SW2 changes to the selection state from the non-selection state, and changes from the non-selection state to the selection state after setting the automatic mode by being depressed for at least one second in the selection state.

Figure 18:
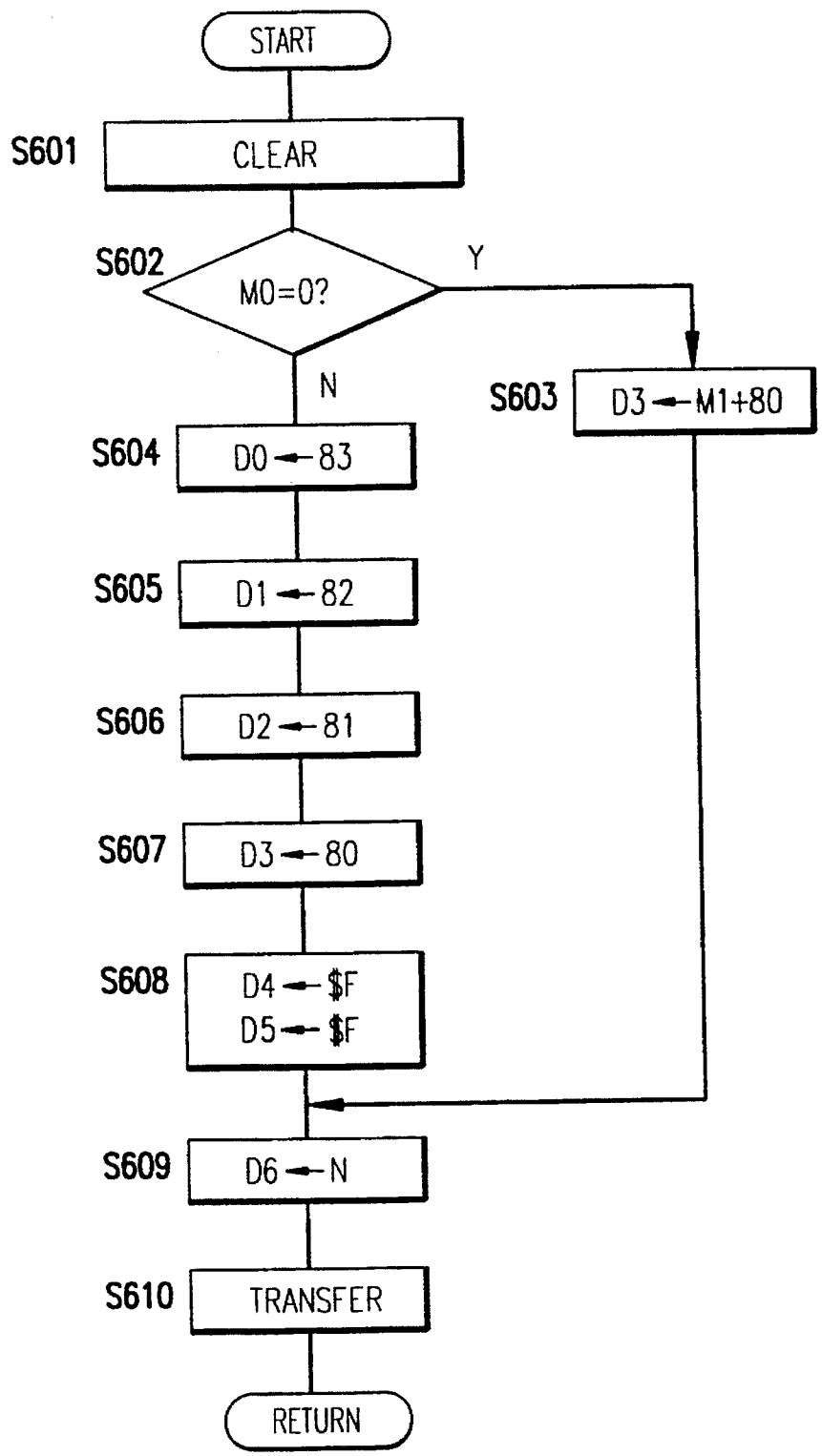
FIG. 18 is flow chart showing the setting process sub-routine implemented at the display step of the main routine of FIG. 16.

FIG. 18 is a flow chart of the display sub-routine executed during control in S504 of FIG. 16. In the example below, the command is transferred by the method described in connection with Tables 5 and 6. Providing displays by using the commands shown in Table 4 and by reading the character patterns shown in FIG. 7 is also possible.

In this case, addresses indicating the display data are transferred in en-size units instead of em-size units. In S601, D 0–D 6, in the regions of RAM 103 where the commands transferred to LCD driver 20 are stored, are cleared. In S602, a determination is made as to whether the state register M 0 is set to 0. When the state register is set to 0, indicating a non-selection state, MCU 10 advances to S603. If the state register is 1, indicating a selection state, MCU 10 moves to S604.

In S603, a value equal to adding 80 from Table 6 to the contents of the mode register M 1 is stored in D 3. At this time, because 80 is stored in D 3 if the mode register M 1 is 0, the automatic mode is enabled in the far left component (i.e., display block 311) of dot matrix display component 310. Similarly, because 81 is stored in D 3 if the mode register M 1 is 1, the scenery mode is enabled in the far left component of dot matrix display component 310. Likewise, because 82 is stored in D 3 if the mode register M 1 is 2, the portrait mode is enabled in the far left component of dot matrix display component 310. In addition, because 83 is stored in D 3 if the mode register M 1 is 3, the close-up mode is enabled, also in the far left component of dot matrix display component 310.

In S604, 83 is stored in D 0, and the close-up mode is enabled in the far right component (display block 314) of dot matrix display component 310. In S605, 82 is stored in D 1, and the portrait mode is enabled in the center-right component (display block 313). In S606, 81 is stored in D 2, and the scenery mode is enabled in the center-left component (display block 312). In S607, 80 is stored in D 3, and the automatic mode is enabled in the far left component (display block 311). In S608, $F is stored in each of D 4 and D 5 such that the four triangle segments (black triangle displays) 34a, 34c, 34d and 34f in auxiliary display component 34 corresponding to each display block 311–314 of dot matrix display component 310 are enabled to flash. In S609, a frame number display is enabled with the seven-segment displays corresponding to film frame number N by storing film frame number N in D 6.

In S610, the commands set in D 0 to D 6 are transferred to driver 20. In this driver, the display patterns corresponding to these set commands are read, and LCD displays are enabled in display panel 30.

Figure 19:
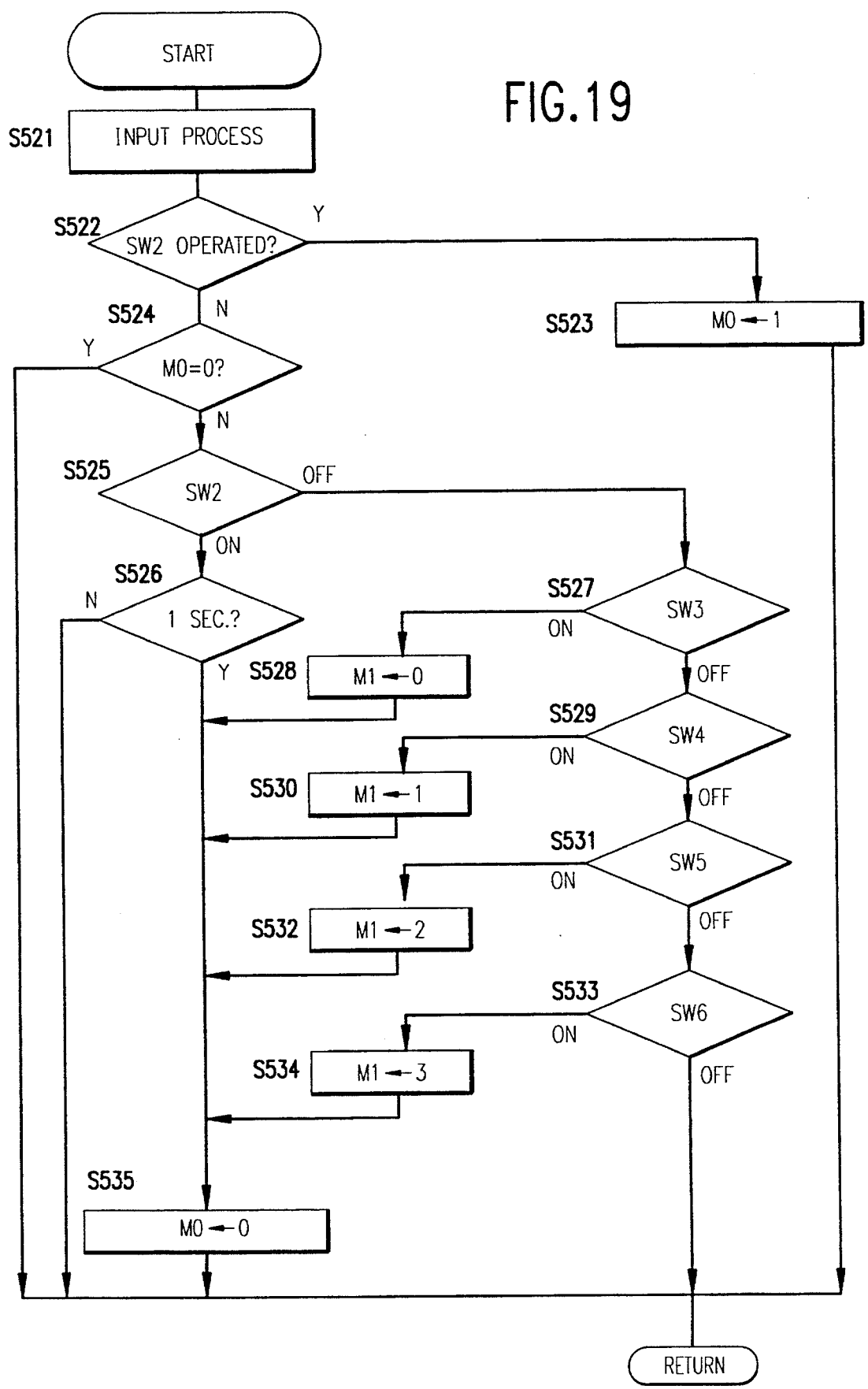
FIG. 19 is a flow chart showing other examples of the sub-routine of the setting process similar to FIG. 17.

Another example of the processes of the present invention is described with reference to FIG. 19, which is a variation of the flow chart in FIG. 17. The difference between FIG. 19 and FIG. 17 is the destination to which MCU 10 jumps from S526. In FIG. 17, when switch SW2 is depressed and at least one second elapses, MCU 10 advances to S528 and then advances to S535. In FIG. 19, however, MCU 10 advances directly to S535, skipping the process in S528.

In other words, with the routine as shown in FIG. 17, when switch SW2 is continuously depressed for at least one second, the camera enters a non-selection state after always being reset to the automatic mode. However, as shown in FIG. 9, the mode register is not overwritten, and because of this the camera returns to the last selected mode and then enters the non-selection state. In other words, the mode selected immediately before is input as the parameter.

With all of the described embodiments above, a liquid crystal display is preferably used as the dot matrix display component, but this is intended to be illustrative and not limiting. Accordingly, the display element can be any device that is capable of providing a dot matrix display.

In the embodiments described, four display blocks 311 through 314 are shown on display panel 30, and the symbol representing each mode is displayed in one line on the first display. Therefore, the selection branches are lined up, so that an inexperienced photographer can recognize the selected branch easily. In addition, switches SW3 through SW6 are placed corresponding to the display blocks 311 through 314. Therefore, an inexperienced photographer is able to recognize the appropriate switch to be selected with certainty. Furthermore, an icon is displayed with the dot display, so that the photographer is able to recognize the selections instinctively.

In the simple mode, the mode selection can be established by selecting one of switches SW3 through SW7 in the first display. In other words, the photographic parameters are input to the camera by selecting one of the selection branches. When the selection branch is selected, it moves to the second display. This second display accomplishes the display only with the symbols indicating the selected mode. Therefore, the photographer is able to recognize the selected state with certainty.

Furthermore, it is possible to return to the first display from the second display by depressing switch SW2. Therefore, the photographer is always able to return the display to the original. It is also possible to move into the automatic mode by depressing switch SW2 for a designated time. In addition, a preselected mode can be called up by SW2. In this case, for example, the special mode register is equipped separately. In the case that SW2 is depressed for more than the designated time, the preselected mode can be entered, assuming that the mode corresponding to the contents of the special register is selected rather than the normal mode register.

The embodiment according to the present invention is equipped with a menu display screen to select the mode and a menu display screen to set the function in the first display in the advanced mode. The mode selection menu display screen is displayed with priority. When the mode selection menu display screen is displayed, if the change operation is received from the change operation component, it is possible to change the first display to the function setting menu display screen. The film sensitivity setting is contained in the function setting menu.

In addition, in the advanced mode, by depressing SW2 continuously, the specific mode stored in advance is implemented. Therefore, it is possible to reduce the selection operation.

In summary, as described, according to the present invention, an inexperienced photographer is able to easily see the data regarding the necessary parameter for the settings. Furthermore, the setting input operation of a desired parameter can be accomplished easily. In addition, by storing the parameters, the selection operation can be shortened.

When a shutter release opportunity (i.e., the chance to take a photograph) arises, photography is possible in at least the automatic mode even when mode selection has not been completed. Accordingly, missed opportunities for photographs can be prevented.

With the present invention, the operation switches and the display correspond with each other so that even a novice can readily understand how to use them. In addition, because the display is large and easy to read, an unfamiliar photographer can readily read information relating to parameters. Moreover, these parameters can be set with ease. Furthermore, when the power source switch and the half-depressed switch are on, parameters are always confirmed. As a result, operating the camera is easy.

What is claimed is:

1. A camera comprising:

a memory storing data including a plurality of parameters corresponding to photographic operation settings;

a display assembly that displays selected parameters from the memory, including a display area that offers a plurality of consecutive alternative display options in the display area;

a selector assembly that selects parameters using the display assembly, including a group of parameter selectors and a change operation selector separate from the group of parameter selectors; and a controller coupled to the memory, the display assembly, and the selector assembly that controls photographic operation based on a selected parameter, wherein the controller controls the display assembly to change the display options in the display area based on operation of the change operation selector, wherein the controller controls the photographic operation based on a preselected default parameter when the change operation selector is continuously operated for a predetermined period of time.

2. The camera of claim 1 wherein the display area displays a group of parameters for selection as a first display option and displays the selected parameter as a second display option.

3. The camera of claim 2 wherein when the display area is displaying the selected parameter, the controller controls the display to return to the first display option based on a signal from the change operation selector.

4. The camera of claim 2 wherein when the display area displays the group of parameters for selection, the controller selects a parameter based on operation of the parameter selectors, and when the display area displays the selected parameter the controller does not respond to operation of the parameter selectors.

5. The camera of claim 1 wherein the controller switches the display between a parameter selection display showing a plurality of possible parameters and a storage display allowing selected parameters to be stored based on operation of the change operation selector.

6. The camera of claim 5 wherein when the display is displaying the storage display, the controller clears previously stored parameters and selectively stores parameters based on operation of the parameter selectors.

7. The camera of claim 1 wherein the controller has a first operating mode and a second operating mode, wherein in the first operating mode, the controller switches the display between a parameter selection display showing a plurality of possible parameters and a selected parameter display showing the parameter selected for the photographic operation based on operation of the change operation switch, and wherein in the second operating mode, the controller switches the display between a parameter selection display showing a plurality of possible parameters and a memory display allowing selected parameters to be stored based on operation of the change operation selector.

8. The camera of claim 1 wherein the controller selects a preprogrammed automatic mode that sets a shutter speed and aperture value as the preselected default parameter.

9. The camera of claim 1 wherein the controller selects a parameter stored by a user as the preselected default parameter, and when no parameter has been stored by the user the controller selects a preprogrammed automatic mode that sets a shutter speed and aperture value as the preselected default parameter.

10. The camera of claim 1 wherein the controller selects a parameter stored by a user as the preselected default parameter.

11. The camera of claim 1 wherein the controller selects a parameter immediately previously selected as the preselected default parameter.

12. The camera of claim 1 wherein the display area includes a plurality of display blocks and each parameter selector from the group of parameter selectors is positioned to correspond to a display block.

13. The camera of claim 12 wherein the display blocks are arranged in a row and the parameter selectors are arranged in a row parallel to the display blocks.

14. The camera of claim 12 wherein the display assembly further includes an auxiliary display section having indicators that indicate a linear optical relationship between each display block and each parameter selector.

15. The camera of claim 14 wherein the auxiliary display section is positioned between the row of the display blocks and the row of parameter selectors.

16. The camera of claim 14 wherein the auxiliary display section includes a plurality of segments each having a form that represents a pointer.

17. The camera of claim 12 wherein the display blocks are formed of a dot matrix display.

18. The camera of claim 13 wherein the controller controls the display assembly to display a pattern representing a parametric branch for parameter selection in at least one display block as a first display option and controls the display assembly to display a pattern representing the selected parameter in one of the display blocks as a second display option.

19. The camera of claim 18 wherein the memory stores data for the patterns representing the parametric branches and the selected parameters.

20. The camera of claim 12 wherein the controller controls the display assembly to display a symbol representing an operating mode in each display block as a first display option.

21. The camera of claim 1 further comprising a body and wherein the group of parameter selectors is installed on a top surface of the body for easy access by a user.

22. The camera of claim 22 wherein the change operation selector is installed on the top surface of the body spaced from the group of parameter selectors toward a center of the camera.

23. The camera of claim 1 wherein the group of parameter selectors and the change operation selector comprise push buttons.

24. The camera of claim 1 wherein the group of parameter selectors and the change operation selector comprise switches.

25. The camera of claim 1 wherein the controller controls the display assembly to display a menu display screen that displays parametric branches as a first display option and to display a function setting menu that displays specific parameter selections as a second display option based upon operation of the change operation selector, wherein the menu display screen is displayed on a priority basis.

26. The camera of claim 25 wherein the display displays patterns for the function setting menu representing parameters for at least one of film sensitivity setting, AF (automatic focus) mode selection, and exposure adjustment quantity setting.

27. A camera comprising:

shutter means for executing a photographic operation;

memory means for storing a plurality of operating parameters;

display means for displaying at least one of the stored parameters for selection by a user;

selector means for selecting operating parameters including parameter selectors that select a parameter from the display and a dual-function operation selector that selects a display screen and that automatically selects a preset parameter; and controller means coupled to the shutter means, the memory means, the display means, and the selector means for controlling the shutter means to execute the photographic operation based on a selected parameter shown on the display means.

28. The camera of claim 27 wherein the display means displays an initial parameter selection screen and an implementation screen displaying the selected parameter, wherein the dual-function selector returns the display screen to the initial parameter selection screen.

29. The camera of claim 27 wherein the control means automatically selects a default parameter when the dual-function selector is operated for a continuous period of time.

30. The camera of claim 29 wherein the control means automatically selects a parameter stored by a user when the dual-function selector is operated for a continuous period of time.

31. The camera of claim 27 wherein the control means automatically selects a parameter from the stored parameters when a parameter is not selected by the selector means based on operation of the dual-function selector.

32. A method of controlling a camera comprising the steps of:

storing data including a plurality of parameters corresponding to photographic operation settings;

displaying selected stored parameters, including offering a plurality of consecutive alternative display options;

selecting parameters using the display assembly by operating selectors corresponding in position to the desired displayed parameters;

changing the display by operating a change operation selector from an initial display of parameter selections;

controlling photographic operation based on a selected parameter; and selecting a default parameter by operating the change operation selector for a continuous period of time.

33. The method of claim 32 wherein the step of selecting a default parameter comprises selecting a preset automatic mode including shutter speed and aperture value.

34. The method of claim 32 wherein the step of selecting a default parameter comprises selecting a stored user preferred parameter.

35. The method of claim 32 wherein the step of selecting a default parameter comprises selecting an immediately previously used parameter.

36. The method of claim 32 wherein in the step of changing the display from an initial display, the initial display displays initial parameter selections.

37. The method of claim 36 wherein the step of changing the display from an initial display includes changing the display to a display showing the selected parameter.

38. The method of claim 36 wherein the step of changing the display from an initial display includes changing the display to a display showing further parameter selections.

* * * * *